United States Patent
Agnello

(10) Patent No.: US 12,445,278 B2
(45) Date of Patent: *Oct. 14, 2025

(54) SYSTEMS AND METHODS FOR TIME-BASED ONE-TIME PASSWORD MANAGEMENT FOR A MEDICAL DEVICE

(71) Applicant: ABIOMED, Inc., Danvers, MA (US)

(72) Inventor: Alessandro Simone Agnello, Danvers, MA (US)

(73) Assignee: ABIOMED, Inc., Danvers, MA (US)

( * ) Notice: Subject to any disclaimer, the term of this patent is extended or adjusted under 35 U.S.C. 154(b) by 576 days.

This patent is subject to a terminal disclaimer.

(21) Appl. No.: 17/705,815

(22) Filed: Mar. 28, 2022

(65) Prior Publication Data

US 2022/0321337 A1    Oct. 6, 2022

Related U.S. Application Data

(63) Continuation of application No. 16/134,213, filed on Sep. 18, 2018, now Pat. No. 11,316,679.

(Continued)

(51) Int. Cl.
*H04L 9/08* (2006.01)
*G06F 21/45* (2013.01)
(Continued)

(52) U.S. Cl.
CPC ............ *H04L 9/0863* (2013.01); *G06F 21/45* (2013.01); *H04L 9/3228* (2013.01);
(Continued)

(58) Field of Classification Search
CPC ... H04L 9/0863; H04L 9/3228; H04L 9/3271; H04L 63/0823; H04L 63/0846; H04L 2209/88; G06F 21/45
(Continued)

(56) References Cited

U.S. PATENT DOCUMENTS 9,002,083 B2   4/2015  Fox et al.
9,215,075 B1   12/2015 Poltorak
(Continued)

FOREIGN PATENT DOCUMENTS

EP    1329789 A1    7/2003
JP    2004207965 A  7/2004
(Continued)

OTHER PUBLICATIONS

Halpin et al. 2017 IEEE 10th International Conference on Cloud Computing "Privacy—Preserving Data Dissemination in Untrusted Cloud", pp. 770-773 (Year: 2017).*

(Continued)

*Primary Examiner* — Khalil Naghdali
(74) *Attorney, Agent, or Firm* — BOTOS CHURCHILL IP LAW LLP

(57) ABSTRACT

A data monitoring system comprising a server communicatively coupled to a client device and a data module via a network. The server is configured to store a private key of a public-private key pair associated with the data module, receive a request from the client device for authenticated access to the data module, and generate an authentication key based at least on the private key and a time. The client device is configured to generate the request for authenticated access to the data module and transmit the request to the server. The data module is configured to store the private key of the public-private key pair associated with the data module, generate the authentication key based at least on the private key and the time, and grant access to the data module if the authentication key generated by the data module and the authentication key generated by the server match.

18 Claims, 19 Drawing Sheets

Related U.S. Application Data

(60) Provisional application No. 62/560,448, filed on Sep. 19, 2017.

(51) Int. Cl.
*H04L 9/32* (2006.01)
*H04L 9/40* (2022.01)

(52) U.S. Cl.
CPC ........ *H04L 9/3271* (2013.01); *H04L 63/0823* (2013.01); *H04L 63/0846* (2013.01); *H04L 2209/88* (2013.01)

(58) Field of Classification Search
USPC .......................................... 713/155
See application file for complete search history.

(56) References Cited

U.S. PATENT DOCUMENTS

| | | |
|---|---|---|
| 9,747,653 B2 | 8/2017 | Haider et al. |
| 9,848,075 B1 | 12/2017 | Ahmad et al. |
| 9,980,140 B1 | 5/2018 | Spencer et al. |
| 10,484,372 B1 | 11/2019 | Johansson et al. |
| 2005/0138357 A1 | 6/2005 | Swenson et al. |
| 2008/0134311 A1 | 6/2008 | Medvinsky et al. |
| 2009/0037729 A1 | 2/2009 | Smith et al. |
| 2009/0323972 A1 | 12/2009 | Kohno et al. |
| 2011/0158411 A1 | 6/2011 | Medvinsky et al. |
| 2015/0032633 A1 | 1/2015 | Haider et al. |
| 2015/0349960 A1 | 12/2015 | Bagley |
| 2016/0259936 A1 | 9/2016 | Mukherjee et al. |
| 2016/0337346 A1 | 11/2016 | Momchilov et al. |
| 2017/0195320 A1 | 7/2017 | Yoo et al. |
| 2017/0222815 A1 | 8/2017 | Meriac et al. |
| 2017/0237565 A1 | 8/2017 | Rommel |
| 2017/0310662 A1 | 10/2017 | Hamlin et al. |
| 2017/0364875 A1 | 12/2017 | Efroni et al. |
| 2018/0007025 A1 | 1/2018 | Oberheide et al. |
| 2018/0007037 A1 | 1/2018 | Reese |
| 2019/0173881 A1 | 6/2019 | Zhang |

FOREIGN PATENT DOCUMENTS

| | | |
|---|---|---|
| JP | 2008270884 A | 11/2008 |
| JP | 2013191962 A | 9/2013 |
| KR | 20050068928 A | 7/2005 |
| KR | 100970538 B1 | 7/2010 |
| WO | 2013113756 A1 | 8/2013 |
| WO | 2014080377 A1 | 5/2014 |

OTHER PUBLICATIONS

Jenkins et al. 2013 IEEE Military Communications Conference, "Trusted Group Key Management For Real-Time Critical Infrastructure Protection", pp. 248-253 (Year: 2013) (Year: 2013).*
Kahani et al., 2016 IEEE, 2nd International Conference on Big Data Security on Cloud, IEEE International Conference on High Performance and Smart Computing, IEEE International Conference on Intelligent Data and Security, "Authentication and Access Control in e-Health Systems in the Cloud" pp. 13-23 (Year: 2016).*
Office Action from corresponding Japanese Application No. 2020-536928 dated Oct. 5, 2022 (4 pp.).
Office Action from corresponding Korean Application No. 2023-066259852 dated Jul. 20, 2023 (18 pp.).
Office Action from corresponding JP Patent Application No. 2023035123 dated Jun. 26, 2024 (6 pp.).
Office Action from corresponding AU Patent Application No. 2023202305 dated Jun. 12, 2024 (3 pp.).
Office Action from corresponding Israeli Patent Application No. 304106 dated Jan. 10, 2024 (4 pp.).
Extended European Search Report from corresponding European Patent Application No. 23163730.7 dated Jun. 30, 2023 (10 pp.).
Ferreira RC: "The Smart Card: A High Security Tool in EDP", Philips Telecommunication Review, Philips Telecommunicatie Industrie N.V. Hilversum, NL, vol. 47, No. 3, Sep. 1, 1989, pp. 1-19, XP000072642.
Office Action issued in corresponding Chinese Patent Application No. 201880070631.7 dated Jul. 5, 2022, (15 pp.).
Office Action from corresponding Israeli Application No. 273355 dated Nov. 3, 2022 (4 pp.).
BSN-Care: A Secure IoT-Based Modern Healthcare System Using Body Sensor Network, Prosanta Gape, Tznelih Hwang IEEE: Sensors Journal, vol. 16, pp. 1-9, Issue: 5, Mar. 1, 2016 (Year: 2016).
International Search Report PCT/US2018/051454, dated Dec. 20, 2018 (5 pages).
Office Action from corresponding Indian Application No. 202017014606 dated Mar. 28, 2022 (6 pages).
Office Action issued in corresponding Chinese Patent Application No. 201880070631.7 dated Dec. 28, 2021, 34 pp.
United States Office Action for U.S. Appl. No. 16/134,213 dated Aug. 21, 2020.
"Design and Develop a Video Conferencing Framework for Real-Time Telemedicine Applications Using Secure Group-Based Communication Architecture", M.L. Mat Kiah, S.H. Al-Bakri, A. A. Zaidan, Muzammil Hussain Journal of Medical Systems, Article No. 133, pp. 1-11, published on Sep. 9, 2014 (Year: 2014).

* cited by examiner

SYSTEMS AND METHODS FOR TIME-BASED ONE-TIME PASSWORD MANAGEMENT FOR A MEDICAL DEVICE

CROSS-REFERENCE TO RELATED APPLICATIONS

The present application is a continuation of U.S. patent application Ser. No. 16/134,213, filed Sep. 18, 2018, now allowed, which claims the benefit of the filing date of U.S. Provisional Application No. 62/560,448, filed on Sep. 19, 2017, the disclosures of which are hereby incorporated herein by reference.

FIELD OF THE INVENTION

The present disclosure relates to systems and methods for implementing a time-based password algorithm that allows users to manage medical devices securely.

BACKGROUND

Medical devices monitoring a patient are often connected to a network for remote access. Many of these medical devices require a password in order to change the management settings of the medical device. Often, these passwords are static and require manual change after a certain amount of time has passed.

However, there remains a long felt need to implement additional security measures on network-connected medical devices in order to protect patient data and prevent successful security attacks.

SUMMARY OF INVENTION

The present disclosure relates to a data monitoring system comprising a server communicatively coupled to a client device and a data module via a data network. The server is configured to store a private key of a public-private key pair associated with the data module, receive a request from the client device for authenticated access to the data module, and generate an authentication key based at least on the private key and a time. The authentication key can be used to allow authenticated access to the data module. The client device is configured to generate the request for authenticated access to the data module and transmit the request to the server. The data module includes a user interface configured to display data and receive a user input. The data module is configured to store the private key of the public-private key pair associated with the data module, receive data from a medical device, generate the authentication key based at least on the private key and the time, and, in response to determining that the authentication key generated by the data module and the authentication key generated by the server match, grant access to the data module.

According to one implementation, the data module is configured to, in response to determining that the authentication key generated by the data module and the authentication key generated by the server do not match, display a message indicating an authentication failure. In some implementations, the data module is configured to grant authenticated access using a challenge-response protocol.

In certain implementations, the data module may transmit the data to the client device upon successful authentication.

According to some implementations, the time is determined independently by the data module and the server. In other implementations, a time determined by the data module is synchronized with a time determined by the server.

In certain implementations, the time is synchronized by rounding the time determined by the data module to a time interval and rounding the time determined by the server to the time interval such that the determined times are the same.

According to some implementations, the time interval is adjustable to set a floor or ceiling of acceptable synchronization precision.

According to one implementation, the time includes at least one of TAI, UTC, and UNIX time. In some implementations, the time is current time.

In certain implementations, the request for authenticated access to the data module includes additional information for instructing the data module. According to some implementations, the additional information includes a request for access to the data module. In some implementations, the additional information includes the time, the time being determined by the server. In other implementations, the additional information includes a request for the data module to enter a maintenance mode.

According to one implementation, the authentication key is a one-time authentication key. In certain implementations, the authentication key expires after a period of time.

In certain implementations, the private key is loaded into the data module during at least one of manufacturing or distribution of the data module. According to some implementations, the private key is further stored by the server after the private key is loaded into the data module.

A second aspect of the present disclosure relates to a method of securely monitoring a data module receiving data from a medical device. The method comprises storing, at a server, a private key of a public-private key pair associated with a data module. Further, the method comprises receiving, at the server, a request from a client device for access to the data module. The method further comprises generating, at the server, an authentication key based at least on the private key and a time. The authentication key can be used to allow authenticated access to the data module. Further, the method comprises receiving, at the server, an indication from the data module that the authentication key generated at the server was entered. The method also comprises, in response to determining that the authentication key generated by the server and an authentication key generated by the data module matches, granting authenticated access to the data module. In one implementation, the authentication key generated by the data module is generated based at least on the private key and the time.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

Figure 1:
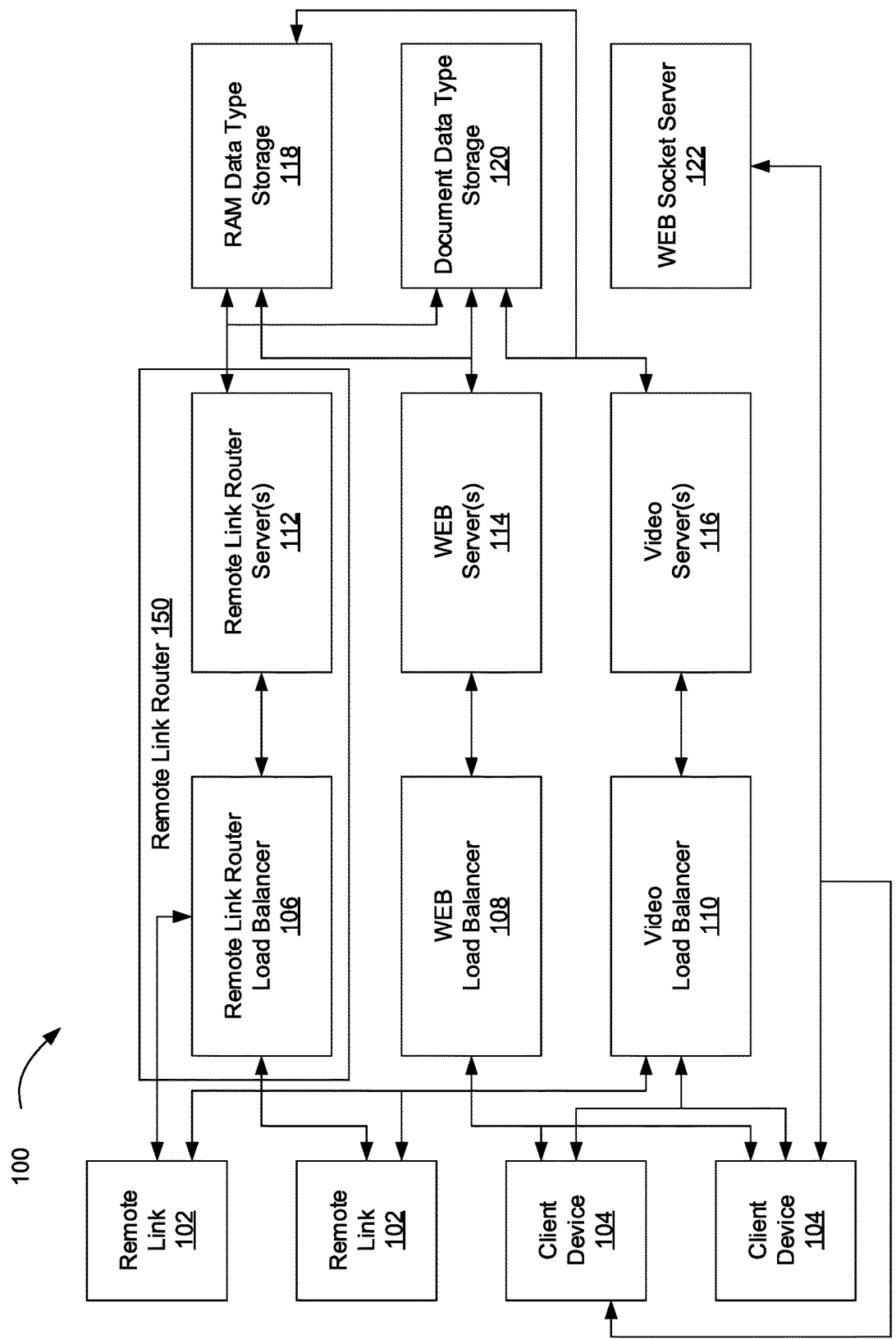
FIG. 1 shows a schematic representation of a remote link architecture, configured according to one or more aspects of the present disclosure.

FIG. 1 is a schematic representation of a remote link architecture 100. Remote link architecture 100 includes remote link 102, client device 104, remote link router (RLR) 150, WEB load balancer 108, video load balancer 110, WEB server 114, video server 116, random-access memory (RAM) data type storage 118, document data type storage 120, and WEB socket server 122.

Remote link 102 may be embedded in a medical device that is monitoring a patient at a hospital, clinic, the patient's house, or another location. Remote link 102 captures images and deliver video streams from the medical device display and transmit the images and video to the remote link router 150. Remote link architecture 100 may comprise multiple remote links 102. Remote link 102 interacts with the rest of remote link architecture 100 through RLR 150. RLR 150 includes an RLR load balancer 106 and RLR server 112. RLR 150 may comprise multiple RLR servers 112. RLR server 112 may include a custom protocol used to communicate with one or more remote links 102. RLR load balancer 106 manages the load to one or more RLR servers 112. RLR load balancer 106 may generate a priority for multiple remote links 102. The priority may be based on preferences obtained from the client device 104. In other aspects, the priority is based on preferences obtained from the remote links 102. In another aspect, the priority is based on preferences obtained from the RLR server 112.

Client device 104 may be a personal computer, a tablet, or a mobile device with an internet connection. A medical professional using client device 104 may be interested in obtaining information from one or multiple remote links 102. Images captured by a remote link 102 may be accessed by the client device 104. In addition, if the medical professional is interested in observing a live video stream of the medical device embedded with remote link 102, the client device can display the video stream. Remote link architecture may comprise multiple client devices 104. A single client device 104 may access multiple remote links 102, as long as the client device has access to the remote links 102.

WEB load balancer 108 controls the load to one or more WEB servers 114. WEB server 114 may include a mechanism for clients to view information, data, and video streams from one or more remote links 102. WEB load balancer 108 may generate a priority for multiple client devices 104. The priority may be based on preferences obtained from the client devices 104. In other aspects, the priority is based on preferences obtained from the remote links 102. In another aspect, the priority is based on preferences obtained from the WEB server 114. WEB socket server 122 may push messages to groups of client devices 104. Upon client device 104 connection to the WEB server 114, the client device 104 will register to the WEB socket server 122 for messages for either one or multiple remote links 102. The WEB socket server 122 will receive messages that will be applicable to one or more remote links 102. This message with associated data will be broadcasted to all connected client devices 104 for updates from those remote links 102.

Video load balancer 110 controls the load to one or more video servers 116. Video server 116 may be the receiver and sender of video streams from one or more remote links 102. Video load balancer 110 may generate a priority for multiple client devices 104. The priority may be based on preferences obtained from the client devices 104. In other aspects, the priority is based on preferences obtained from the remote links 102. In another aspect, the priority is based on preferences obtained from the video server 116.

RAM data type storage 118 may be volatile storage that can be accessed quickly. RAM data type storage 118 may comprise dynamic random-access memory (DRAM), static random-access memory (SRAM), or another type of high-speed volatile memory. Images captured by remote link 102 may be stored in RAM data type storage 118 before being transmitted to client device 104. RAM data type storage 118 may also store video streams captured by remote link 102. Document data type storage 120 may be non-volatile storage that can maintain data for long periods of time. Document data type storage 120 may be hard disks, optical disks, solid-state drives (SSDs), or another type of non-volatile memory.

Figure 2:
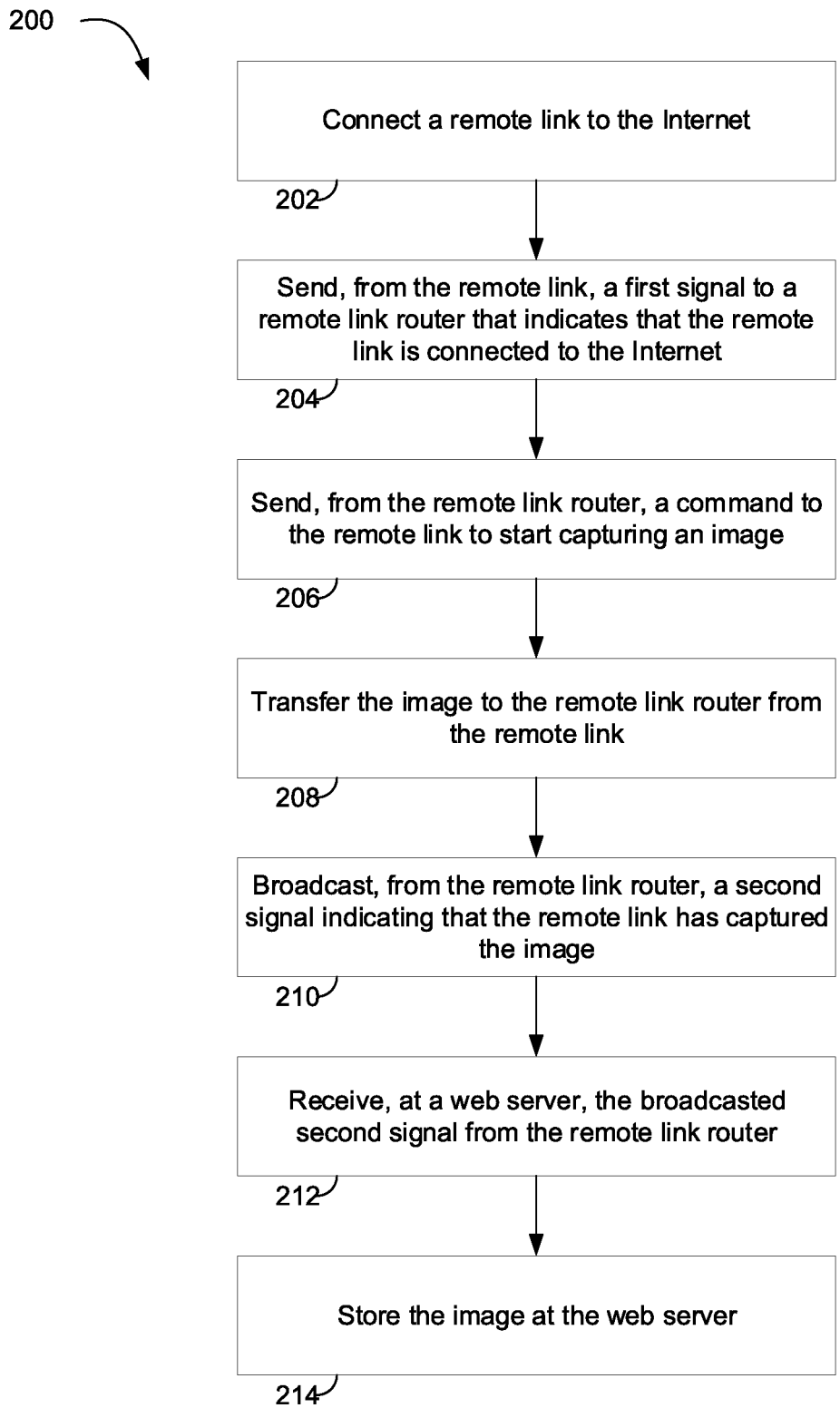
FIG. 2 is a flow diagram of method steps for transferring data from a medical device to a server, according to an aspect of the present disclosure.

A process 200 of transferring an image from a remote link 102 to a remote link router server 112 is illustrated in FIG. 2. Process 200 begins by connecting a remote link 102 to the internet at step 202. Step 202 may include a process to initialize remote link 102 as described below by process 500 in FIG. 5.

Process 200 continues by sending, from the remote link 102, a first signal to an RLR 150 that indicates that the remote link 102 is connected to the internet as step 204. The first signal may be sent directly to the RLR load balancer 106. In another aspect, the first signal may be sent directly to the RLR server 112.

Process 200 continues by sending, from the RLR 150, a command to the remote link 102 to start capturing an image at step 206. For example, remote link 102 uses image capture unit 626, described below, to capture the image from a medical device.

Process 200 continues by transferring the image to the RLR 150 from the remote link 102 at step 208. For example, RLR load balancer manages the transfer of the image from the remote link 102 to the RLR server 112. Once the image has been transferred to the RLR server 112, process 200 continues to step 210.

Process 200 continues by broadcasting, from the RLR 150, a second signal indicating that the remote link 102 has captured the image at step 210. For example, RLR 150 broadcasts the second signal such that the WEB servers 114 are notified that RLR 150 has the image captured by remote link 102.

Process 200 continues by receiving, at a WEB server 114, the broadcasted second signal from the remote link 102 at step 212. For example, WEB server 114 receives the broadcasted signal from RLR 150 so that the WEB server 114 is notified that RLR 150 has the image captured by remote link 102.

Process 200 finishes by storing the image at the WEB server 114 at step 214. The image may be stored in RAM data type storage 118. For example, RLR 150 transfers the image to WEB server 114, after which WEB server 114 transfers the image to RAM data type storage 118. In one aspect, RLR 150 may transfer the image directly to RAM data type storage 118.

Figure 3:
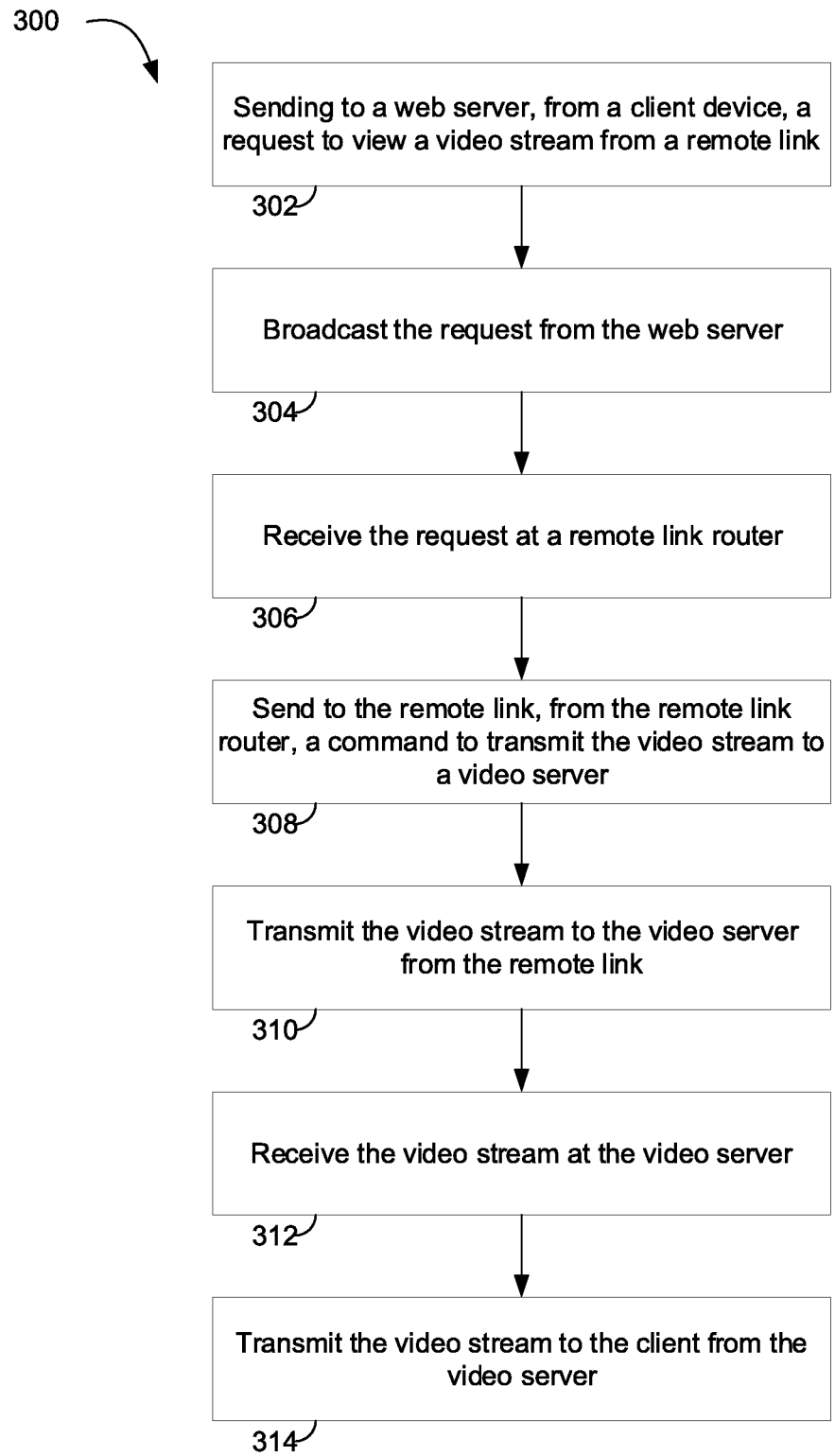
FIG. 3 is a flow diagram of method steps for transferring data from a medical device to a server, according to an aspect of the present disclosure.

A process 300 of transferring a video stream from a remote link 102 to a client device 104 is illustrated in FIG. 3. Process 300 begins by sending to a WEB server 114, from a client device 104, a request to view a video stream from a remote link 102 at step 302. The request may be sent through WEB load balancer 108 before being transmitted to the WEB server 114. In one aspect, the request may include information identifying the remote link 102 that is to be accessed.

Process 300 continues by broadcasting the request from the WEB server 114 at step 304. For example, the WEB server 114 notifies the RLRs 150 that a client device 104 has requested to view a video stream from a remote link 102 by broadcasting the request to all of the RLRs 150.

Process 300 continues by receiving the request at an RLR 150 at step 306. For example, RLR server 112 receives the request from the WEB server 114. In one aspect, RLR 150 receives the request after determining that the request identifies a remote link 102 that is communicatively coupled to the RLR 150.

Process 300 continues by sending to the remote link 102, from the RLR 150, a command to transmit the video stream to a video server 116 at step 308. For example, RLR server 112 transmits a signal through RLR load balancer 106 to remote link 102 that initiates a process to transmit a video stream from the remote link 102 to the video server 116.

Process 300 continues by transmitting the video stream to the video server 116 from the remote link 102 at step 310. In one aspect, the remote link 102 transmits the video stream to the video load balancer 110 which determines which video server 116 to send the video stream. The video load balancer 110 may make the determination based on the load of the video servers 116 and a priority of the remote link 102 and client device 104.

Process 300 continues by receiving the video stream at the video server 116 at step 312. For example, once video load balancer 110 determines which video server 116 can receive the video stream, the video server 116 receives the video stream.

Process 300 finishes by transmitting the video stream to the client device 104 from the video server 116. For example, the video server 116 initiates transfer of the video stream to the client device 104 through video load balancer 110.

Figure 4:
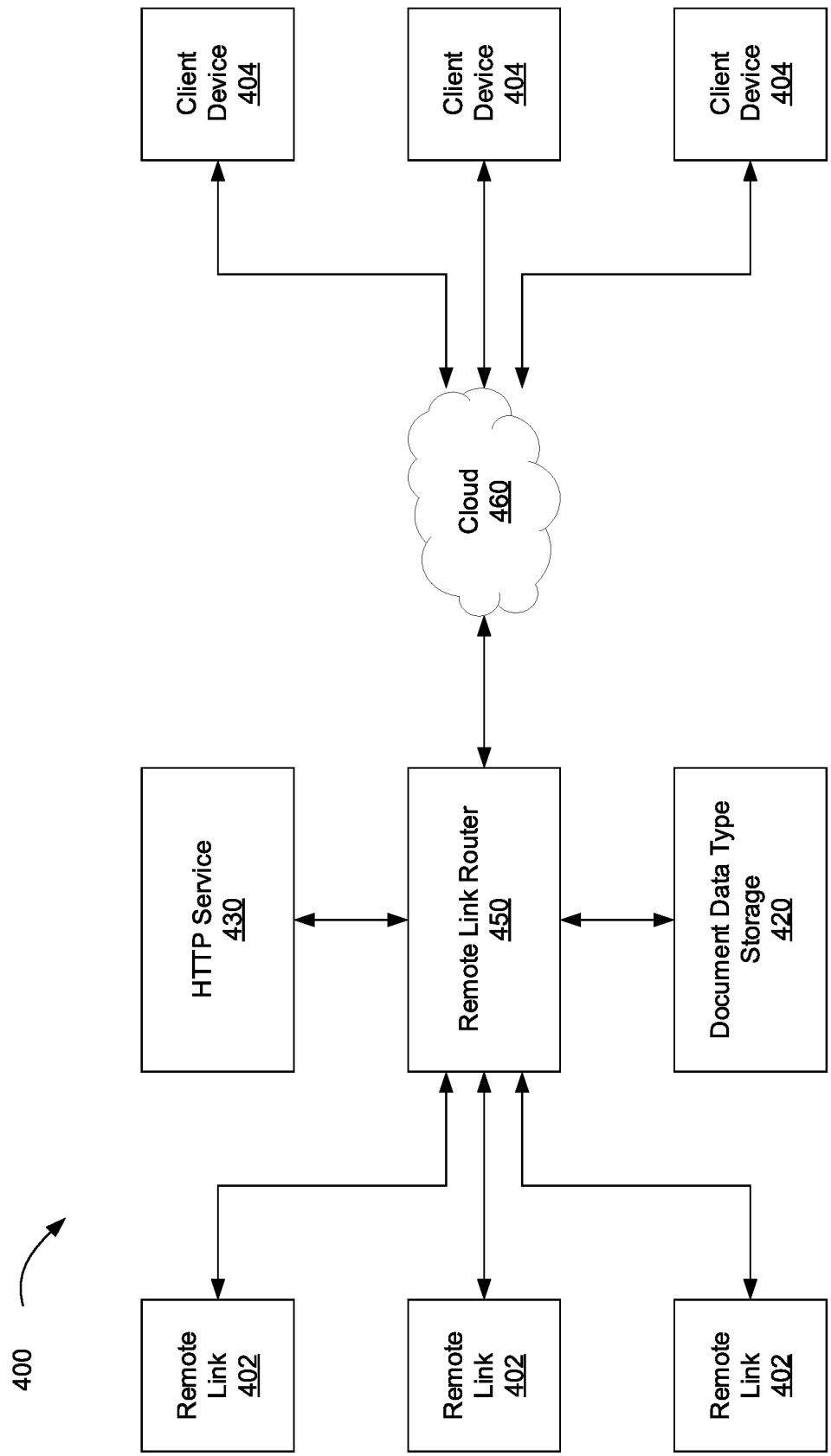
FIG. 4 shows a schematic representation of a remote link architecture, configured according to one or more aspects of the present disclosure.

FIG. 4 shows a schematic representation of a remote link architecture 400.

Remote link architecture 400 includes remote link 402, client device 404, RLR 450, document data type storage 420, HTTP service 430, and cloud 460.

Remote link 402 is similar to remote link 102 and may be embedded in a medical device that is monitoring a patient at a hospital, clinic, the patient's house, or another location. Remote link 402 may capture images and deliver video streams from the medical device display and transmit the images and video to the remote link router 450. Remote link architecture 400 may comprise multiple remote links 402. Remote link 402 interacts with the rest of remote link architecture 400 through RLR 450. RLR 450 is similar to RLR 150 described above.

Client device 404 is similar to client device 104 and may be a personal computer, a tablet, or a mobile device with an internet connection. A medical professional using client device 404 may be interested in obtaining information from one or multiple remote links 402. Images captured by a remote link 402 may be accessed by the client device 404. In addition, if the medical professional is interested in observing a live video stream of the medical device embedded with remote link 402, the client device can display the video stream. Remote link architecture may comprise multiple client devices 404. A single client device 404 may access multiple remote links 402, as long as the client device has access to the remote links 402. Client device 404 may communicate with RLR 450 through cloud 460. Cloud 460 represents a network of internet-based devices and connections such as servers, storage, and applications.

Document data type storage 420 is similar to document data type storage 120 and may be non-volatile storage that can maintain data for long periods of time. Document data type storage 420 may be hard disks, optical disks, solid-state drives (SSDs), or another type of non-volatile memory. Document data type storage 420 may store Wi-Fi credentials or other initialization information obtained from one or more client devices 404 or from RLR 450. Document data type storage 420 may transmit the Wi-Fi credentials or other initialization information to RLR 450 or directly to one or more remote links 402.

HTTP service 430 may be a framework that provides the ability for the RLR 450 to make HTTP requests. RLR 450 may use HTTP service 430 to obtain Wi-Fi credentials or other initialization information and store the information in document data type storage 420.

Figure 5:
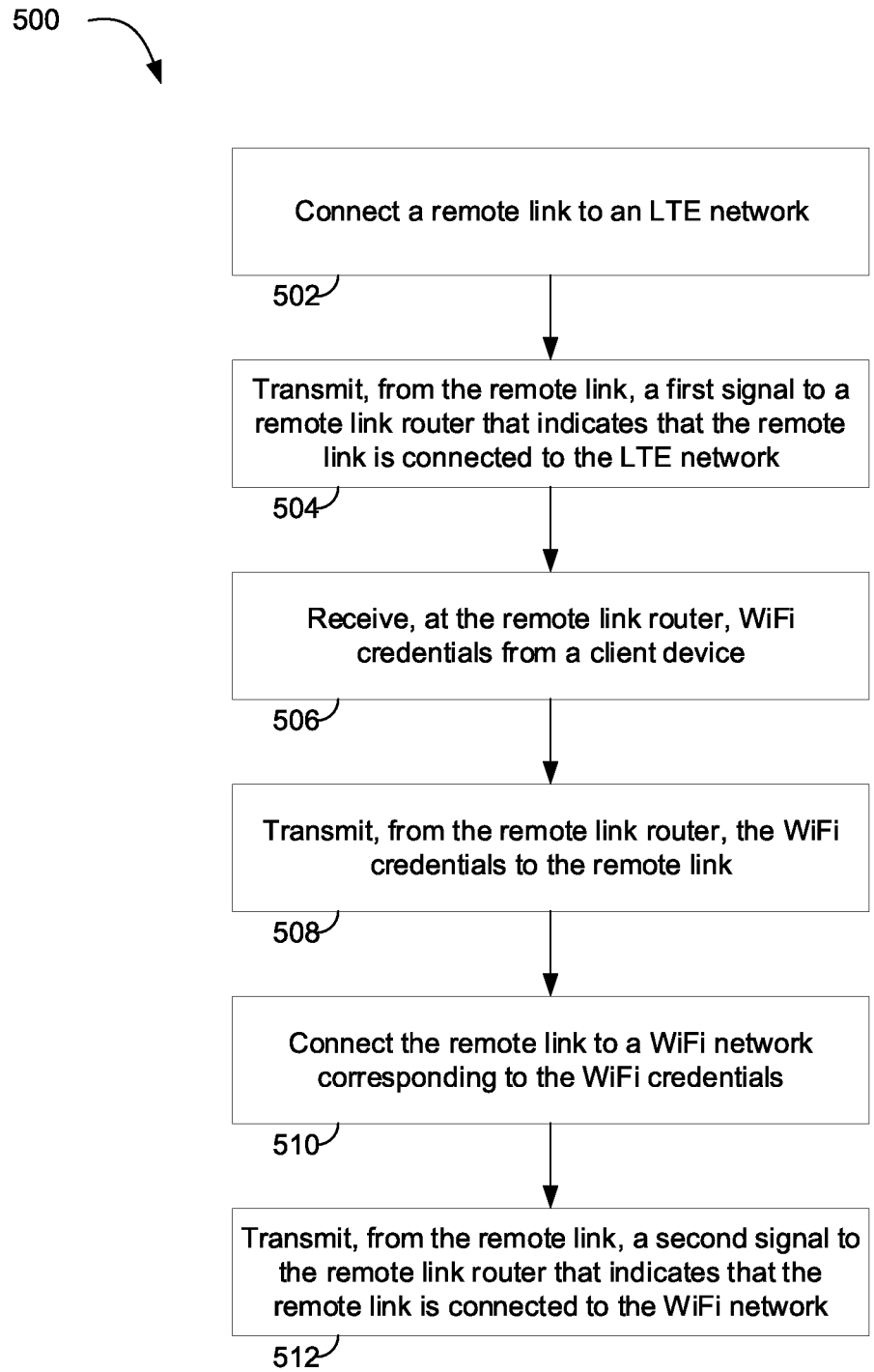
FIG. 5 is a flow diagram of method steps for initializing a remote link, according to an aspect of the present disclosure.

A process 500 of initializing a remote link 402 is illustrated in FIG. 5. Process 500 begins by connecting a remote link 402 to an LTE network at step 502. In another aspect, the remote link 402 may connect to a 3G or 4G network.

Process 500 continues by transmitting, from the remote link 402, a first signal to an RLR 450 that indicates that the remote link 402 is connected to the LTE network at step 504.

For example, once the remote link 402 is online, it transmits a signal to the RLR 450 in order to notify the RLR 450 that it is ready to transmit or receive data. In one aspect, the RLR 450 is also connected to the LTE network.

Process 500 continues by receiving, at the RLR 450, Wi-Fi credentials from a client device 404 at step 506. For example, a user inputs the Wi-Fi credentials onto a client device 404 which then transmits the Wi-Fi credentials to the RLR 450. In one aspect, RLR 450 has the Wi-Fi credentials stored.

Process 500 continues by transmitting, from the RLR 450, the Wi-Fi credentials to the remote link 402 at step 508. For example, the RLR 450 transmits the Wi-Fi credentials to the remote link 402 using the LTE network.

Process 500 continues by connecting the remote link 402 to a Wi-Fi network corresponding to the Wi-Fi credentials at step 510. For example, once the remote link 402 has received the Wi-Fi credentials, remote link 402 searches for the Wi-Fi network identified by the Wi-Fi credentials and connect to it.

Process 500 finishes by transmitting, from the remote link 402, a second signal to the RLR 450 that indicates that the remote link 402 is connected to the Wi-Fi network. For example, in order to confirm that the remote link 402 has successfully connected to the Wi-Fi network, remote link 402 sends a signal to the RLR 450 using the Wi-Fi network that indicates that it has successfully connected. In another aspect, remote link 402 sends the signal to the RLR 450 using the LTE network if the connection is faster than the Wi-Fi network. In one aspect, if the remote link 402 cannot connect to the Wi-Fi network, it sends a signal to the RLR 450 using the LTE network that indicates that the connection was not successful.

Figure 6:
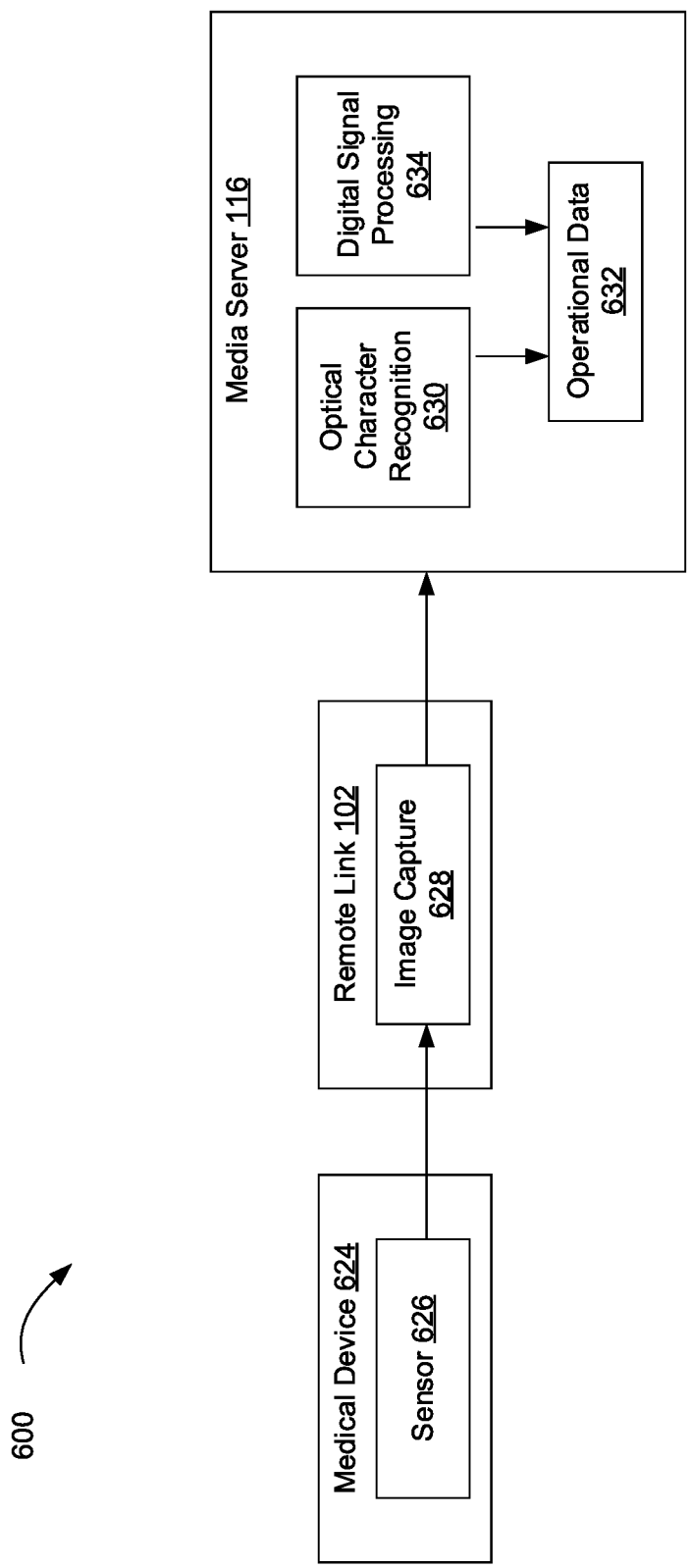
FIG. 6 shows a schematic representation of a remote link architecture, configured according to one or more aspects of the present disclosure.

FIG. 6 shows a schematic representation of a remote link architecture 600.

Remote link architecture 600 includes medical device 624, remote link 102, and media server 116. Medical device 624 may include a sensor 626. Remote link 102 may include an image capture unit 628. Media server 116 may include an optical character recognition unit 630 and operational data unit 632.

Medical device 624 may be a medical device that is monitoring a patient at a hospital, clinic, the patient's house, or another location. Medical device 624 includes a sensor 626 that may be measuring and recording health signals from a patient. The sensor 626 may be a pressure sensor, temperature sensor, flow rate sensor, voltage sensor, current sensor, optical sensor, or audio sensor.

Image capture unit 628 may be an application that enables remote link 102 to capture images from sensor 626. For example, image capture unit 628 captures an image of the display of medical device 624. The image of the display of medical device 624 may include data from sensor 626 represented alphanumerically or graphically, in a waveform plot. Image capture unit 628 may convert analog data captured from sensor 626 into digital data that may be used by optical character recognition unit 630. For example, image capture unit 628 converts an analog signal from a video graphics array (VGA) connection from sensor 626. Optical character recognition (OCR) may be used to convert images of text or shapes into digital data, as further described in relation to FIGS. 10-14. In another aspect, other OCR equivalents, and/or digital signal processing (DSP) may be used to extract data from images.

OCR unit 630 may be an application that electronically converts images of text or shapes into digital data. For example, OCR unit 630 analyzes the image captured by image capture unit 628 in remote link 102 to extract data from the data embedded in the image. The OCR unit 630 may be able to extract data from a waveform.

In one aspect, media server 116 may include a DSP unit 634. DSP unit 634 may be an application that converts images into digital data. For example, DSP unit 634 converts the image captured by image capture unit 628 in remote link 102 to digital data. Once in digital form, media server 116 may identify and/or filter the operational and/or medical data that is embedded in the image. In another aspect, DSP unit 634 may be used to extract data from a waveform included in the image. For example, OCR unit 630 extracts a period from a waveform portion of an image and DSP unit 634 uses the period and boundaries of the waveform to extract operational and/or medical data. By using the period and boundaries of the waveform portion of the image, DSP unit 634 associates the pixels in the waveform portion with a unit of time. In some aspects, OCR unit 630 is used to extract a measurement unit from the waveform portion of the image and DSP unit 634 uses the period and the measurement unit to extract operational and/or medical data. For example, OCR unit 630 determines that the waveform portion of the image displays placement signal and/or motor current over a period of ten seconds, and DSP unit 634 associates each pixel in the waveform portion with a corresponding placement signal and/or motor current, and a unit of time equal to the period divided by the number of pixels in the waveform portion of the image.

Operational and/or medical data unit 632 may be an application that databases and organizes the data extracted from OCR unit 630 and/or DSP unit 634. For example, operational data unit 632 identifies the type of data extracted by OCR unit 630 and/or DSP unit 634, and categorize the data into operational and/or medical conditions. Operational and/or medical conditions may include pressure, flow rate, pump speed, temperature, voltage, current, and biometric conditions.

Remote link architecture 600 can be implemented with process 200, process 300, and process 500 to control the bandwidth, quality, and type of video streaming from remote link devices 102. Remote link architecture 600 may be scaled to an indefinite amount of remote link devices 102 and client devices 104. OCR unit 630 and operational data unit 632 may be included in another component of remote link architecture 100, remote link architecture 400, remote link architecture 600, or remote link architecture 700 (described below).

Figure 7:
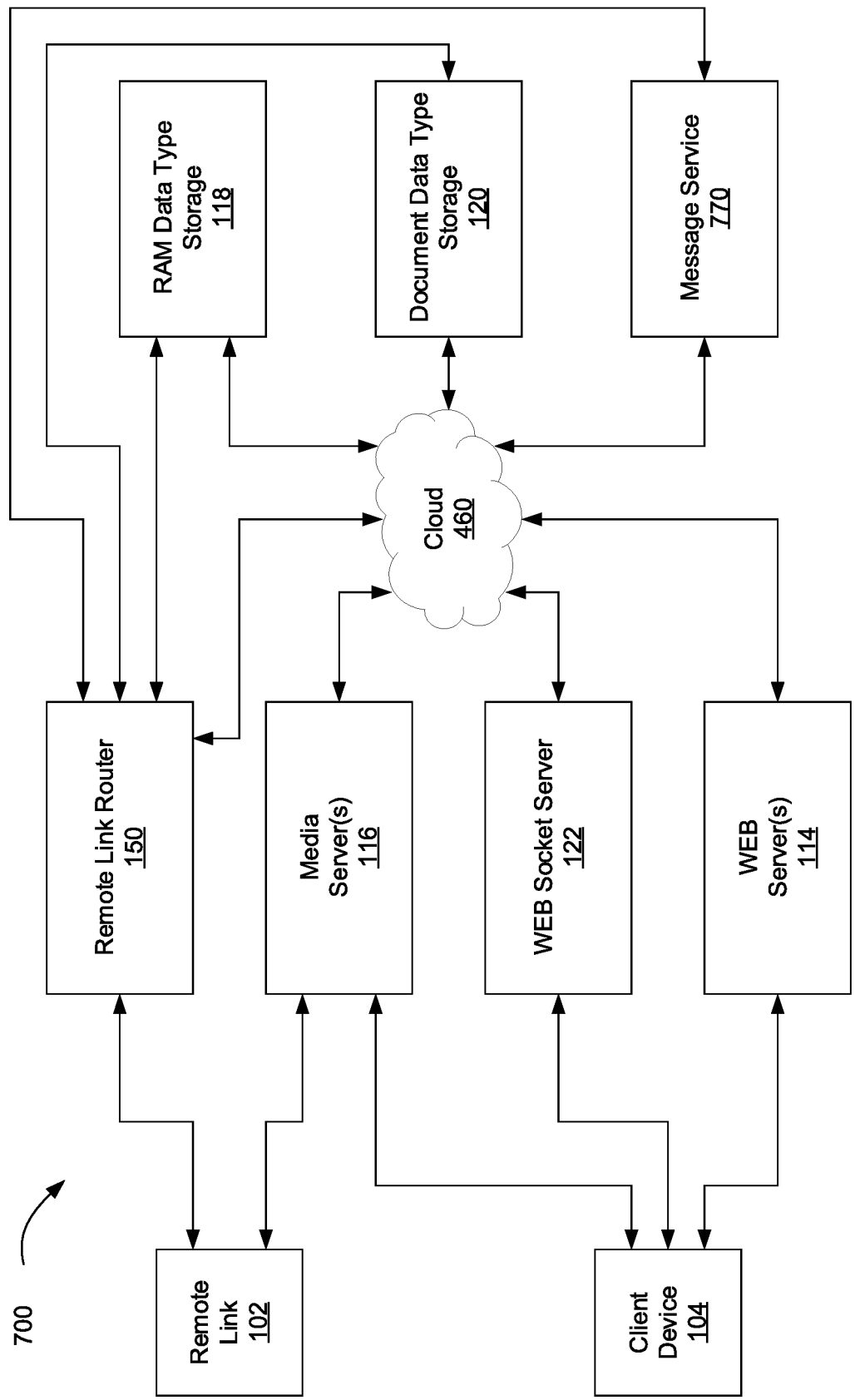
FIG. 7 shows a schematic representation of a remote link architecture, configured according to one or more aspects of the present disclosure.

FIG. 7 is a schematic representation of a remote link architecture 700. Remote link architecture 700 includes remote link 102, client device 104, RLR 150, media server 116, WEB socket server 122, WEB server 114, cloud 460, RAM data type storage 118, document data type storage 120, and message service 770.

Remote link 102 may be embedded in a medical device that is monitoring a patient at a hospital, clinic, the patient's house, or another location. Remote link 102 may capture images and deliver video streams from the medical device display and transmit the images and video to the remote link router 150. Remote link architecture 100 may comprise multiple remote links 102. Remote link 102 interacts with the rest of remote link architecture 100 through RLR 150.

Client device 104 may be a personal computer, a tablet, or a mobile device with an internet connection. A medical professional using client device 104 may be interested in obtaining information from one or multiple remote links 102. Images captured by a remote link 102 may be accessed by the client device 104. In addition, if the medical professional is interested in observing a live video stream of the medical device embedded with remote link 102, the client device can display the video stream. Remote link architecture may comprise multiple client devices 104. A single client device 104 may access multiple remote links 102, as long as the client device has access to the remote links 102.

WEB server 114 may include a mechanism for clients to view information, data, and video streams from one or more remote links 102. WEB socket server 122 may push messages to groups of client devices 104. Upon client device 104 connection to the WEB server 114, the client device 104 will register to the WEB socket server 122 for messages for either one or multiple remote links 102. The WEB socket server 122 will receive messages that will be applicable to one or more remote links 102. This message with associated data will be broadcasted to all connected client devices 104 for updates from those remote links 102. Message service 770 may manage the transfer of messages between the different components of remote link architecture 700 through cloud 460. Cloud 460 represents a network of internet-based devices and connections such as servers, storage, and applications.

Media server 116 may be the receiver and sender of video streams from one or more remote links 102. Media server 116 may be similar to video server 116 described above. Media server 116 may also be the receiver and sender of images captured from one or more remote links 102.

RAM data type storage 118 may be volatile storage that can be accessed quickly. RAM data type storage 118 may comprise dynamic random-access memory (DRAM), static random-access memory (SRAM), or another type of high-speed volatile memory. Images captured by remote link 102 may be stored in RAM data type storage 118 before being transmitted to client device 104. RAM data type storage 118 may also store video streams captured by remote link 102. Document data type storage 120 may be non-volatile storage that can maintain data for long periods of time. Document data type storage 120 may be hard disks, optical disks, solid-state drives (SSDs), or another type of non-volatile memory.

Figure 8:
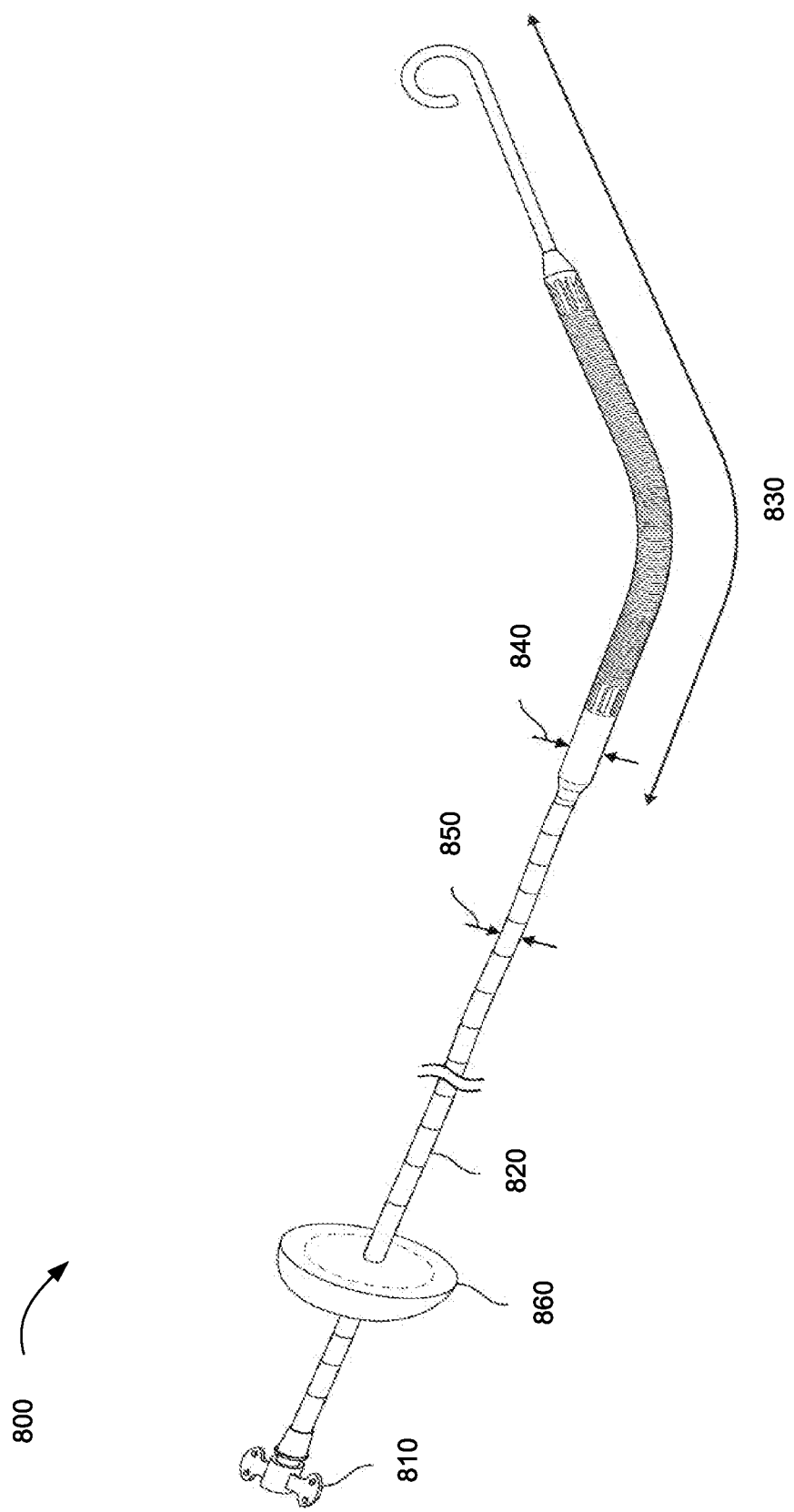
FIG. 8 shows a schematic representation of a medical device, configured according to one or more aspects of the present disclosure.

FIG. 8 shows an illustrative medical device such as an intravascular blood pump 800 according to certain implementations. The pump 800 comprises a pump handle 810, a pump head 830, a catheter 820 connecting the pump handle 810 to the pump head 830, and a connecting hub 860. The catheter 820 is tubular and has a substantially uniform outer diameter 850. The catheter 820 enables the pump head 830 and the pump handle 810 to be in electro-mechanical communication. The pump handle 810 is in communication with control circuitry which allows the control of the pump head 830. The pump head 830 contains electro-mechanical components that enable the device to perform various tasks within the body of a patient, such as pump blood from a location within the body. The pump head 830 has a diameter 840 that is larger than the diameter 850 of the catheter 820. An example of such a percutaneous pump is the Impella 2.5® system (Abiomed, Inc., Danvers, Mass.) which includes the pump and an Automatic Impella Controller (AIC).

Figure 9:
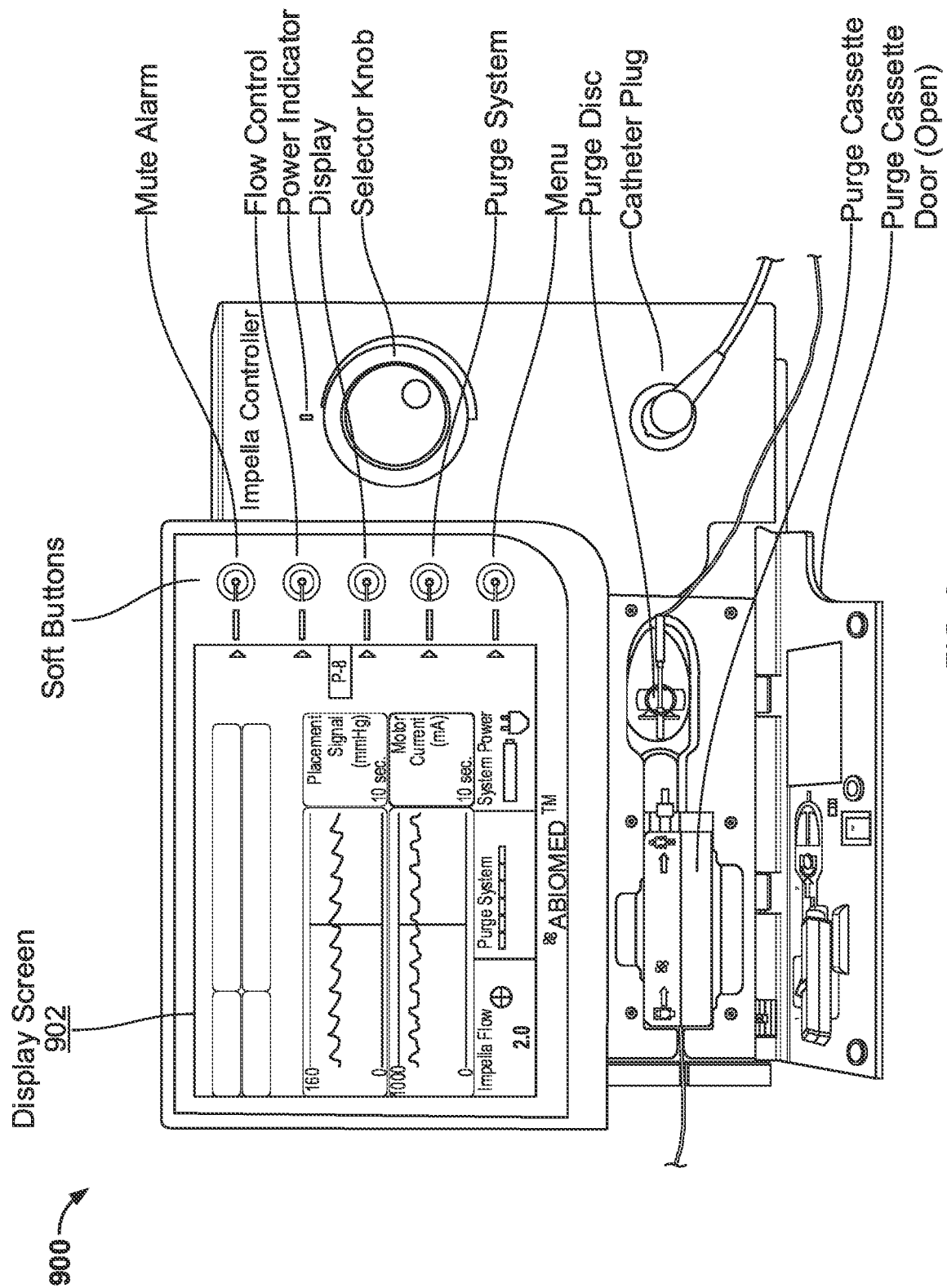
FIG. 9 shows an exemplary medical device controller, configured according to one or more aspects of the present disclosure.

FIG. 9 shows an exemplary medical device controller 900, such as the AIC, configured according to one or more aspects of the present disclosure. The medical device controller 900 provides an interface for monitoring and controlling the functions of pump 800. Medical device controller 900 may include display screen 902 that may display images from a video stream where the images illustrate data associated with a medical device such as an intravascular blood pump 800 over a period of time. In certain implementations, display screen 902 displays real-time operating and/or medical data associated with the pump 800.

Figure 10:
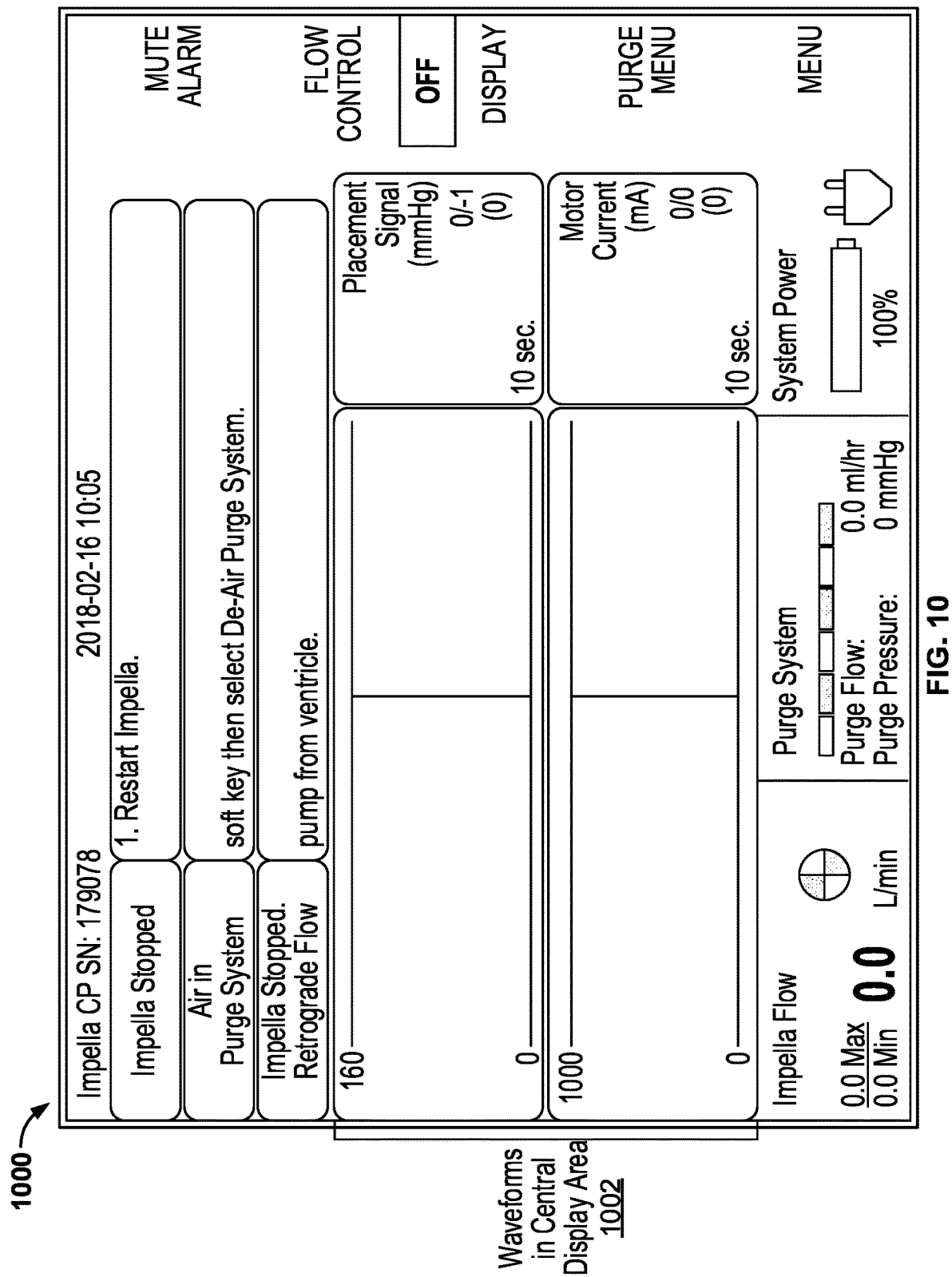
FIG. 10 shows an exemplary image displayed on a medical device controller screen, configured according to one or more aspects of the present disclosure.

FIG. 10 shows an exemplary image 1000 displayed on, for example, the display screen 902, configured according to one or more aspects of the present disclosure. In some configurations, the image 1000 may be captured by an intermediate device or data module such as remote link 102 via a network and transmitted to another device such as, for example, media server 116. Image 1000 may include waveforms 1002. Waveforms 1002 illustrate medical and/or operational data corresponding to the operation of pump 800. Examples of medical data illustrated by waveforms 1002 include placement signal and motor current. The waveforms 1002, such as the motor current waveform may provide a history, representation, and/or illustration of motor current over a period time (e.g., 10 seconds). In this way, the image 1000 includes motor current data (and other data) associated with pump 800 over a 10 second period of time. Hence, in one implementation, a data module 102 continuously monitors a video stream output from the device controller 900, but only periodically capture an image such as image 1000. Then the data module 102 transmits the image 1000 to another device, such as server 116, which converts the illustrated waveforms 1002 to medical and/or operation data using, for example, OCR. If, for example, the waveforms 1002 illustrate medical data over a 10 second period, the data module 102 may capture successive images 1000 every 10 second (at 10 second intervals) to ensure that there are no gaps in the data provided to server 116. Processes 1300 and 1400, as discussed in relation to FIGS. 13 and 14 below, describe exemplary methods of extracting data from an image and determining the validity of the extracted data, respectively.

Figure 11:
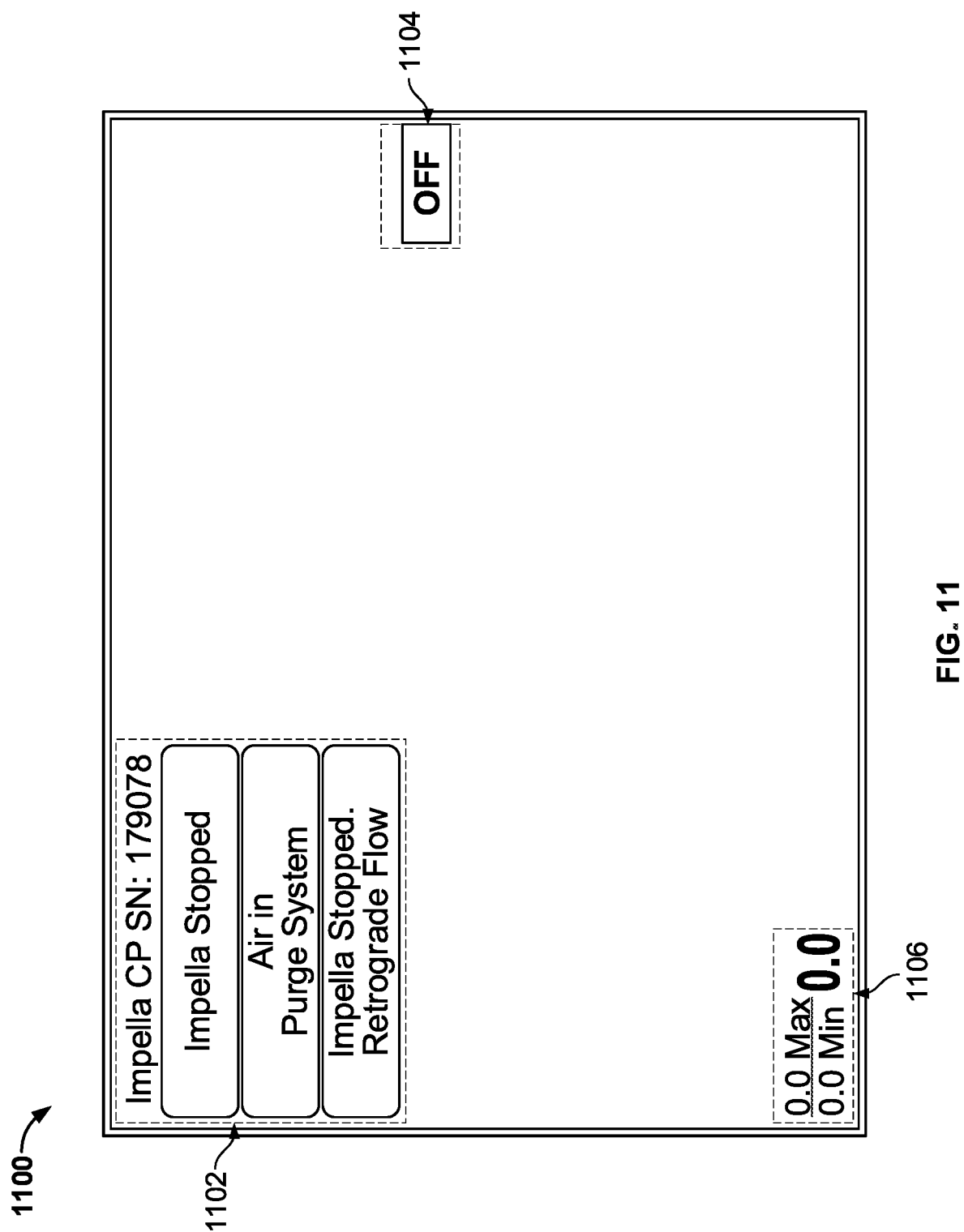
FIG. 11 shows the exemplary image of FIG. 10 after removing select portions of the image, configured according to one or more aspects of the present disclosure.

In one aspect, server 116 masks certain portions of image 1000 before extracting the data using OCR unit 630 or an equivalent. FIG. 11 shows an exemplary image 1100, configured according to one or more aspects of the present disclosure. Image 1100 is a masked version of image 1000 that has been stripped of certain portions of image 1000. For example, all portions of image 1000 are stripped except alarm and serial number portion 1102, performance level portion 1104, and flow level portion 1106. After generating image 1100, server 116 performs image processing to clarify and enlarge alarm and serial number portion 1102, performance level portion 1104, and flow rate portion 1106.

Figure 12:
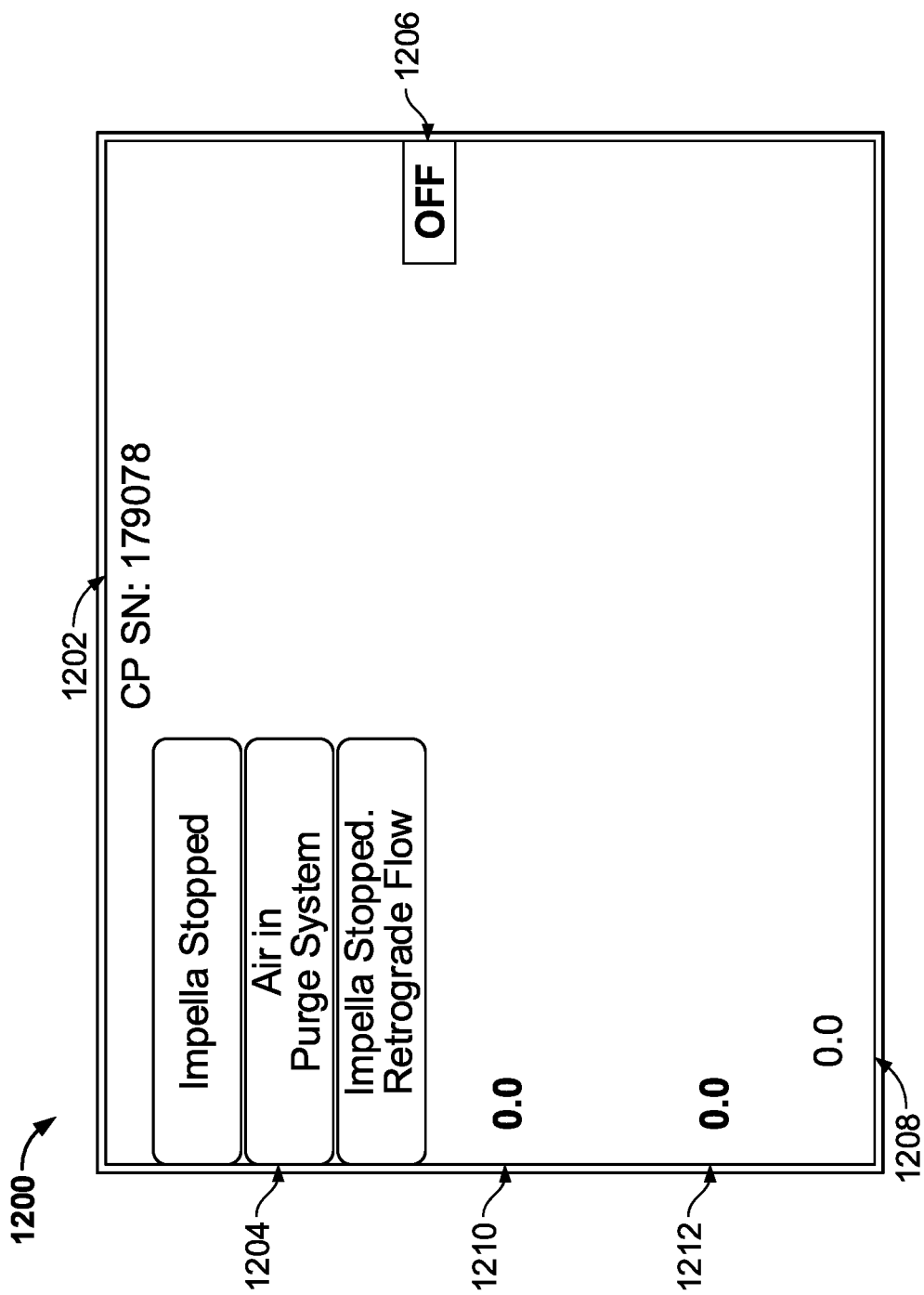
FIG. 12 shows an exemplary image of the remaining portions of the image of FIG. 11, configured according to one or more aspects of the present disclosure.

FIG. 12 shows an exemplary image 1200, configured according to one or more aspects of the present disclosure. Image 1200 is a processed version of image 1100 in order to facilitate the extracting of data using OCR unit 630. In one aspect, alarm and serial number portion 1102 may be processed into serial number portion 1202 and alarm portion 1204. Serial number portion 1202 includes a certain number of digits that identify the medical device 624 that is currently being monitored and may be enlarged to facilitate OCR. For example, serial number portion 1202 includes six digits. Alarm portion 1204 may indicate the type of alarm that the medical device 624 may be experiencing. For example, alarm portion 1204 includes pixels of a color that indicate a severity of the alarm the medical device 624 may be experiencing. Examples of the colors in the alarm portion 1204 include red, yellow, and green. In some aspects, performance level portion 1206 indicates the performance level of the pump 800 and includes three characters. Examples of the characters in the performance level portion 1206 may include "OFF" "P-0" "P-1", "P-2" "P-3" "P-4" "P-5" "P-6" "P-7" "P-8", and "P-9". Performance level portion 1206 may be an enlarged version of performance level portion 1104. In another aspect, flow rate portion 1106 may be processed into present flow rate portion 1208, max flow rate portion 1210, and min flow rate portion 1212. Present flow rate portion 1208 indicates the present flow rate of pump 800 in units of liters per minute. Correspondingly, max flow rate portion 1210 and min flow rate portion 1212 indicate the range of the flow rate of the pump 800, respectively, and may be enlarged to facilitate OCR. Present flow rate portion 1208, max flow rate portion 1210, and min flow rate portion 1212 includes three characters that range from "0.0" to "9.9".

Figure 13:
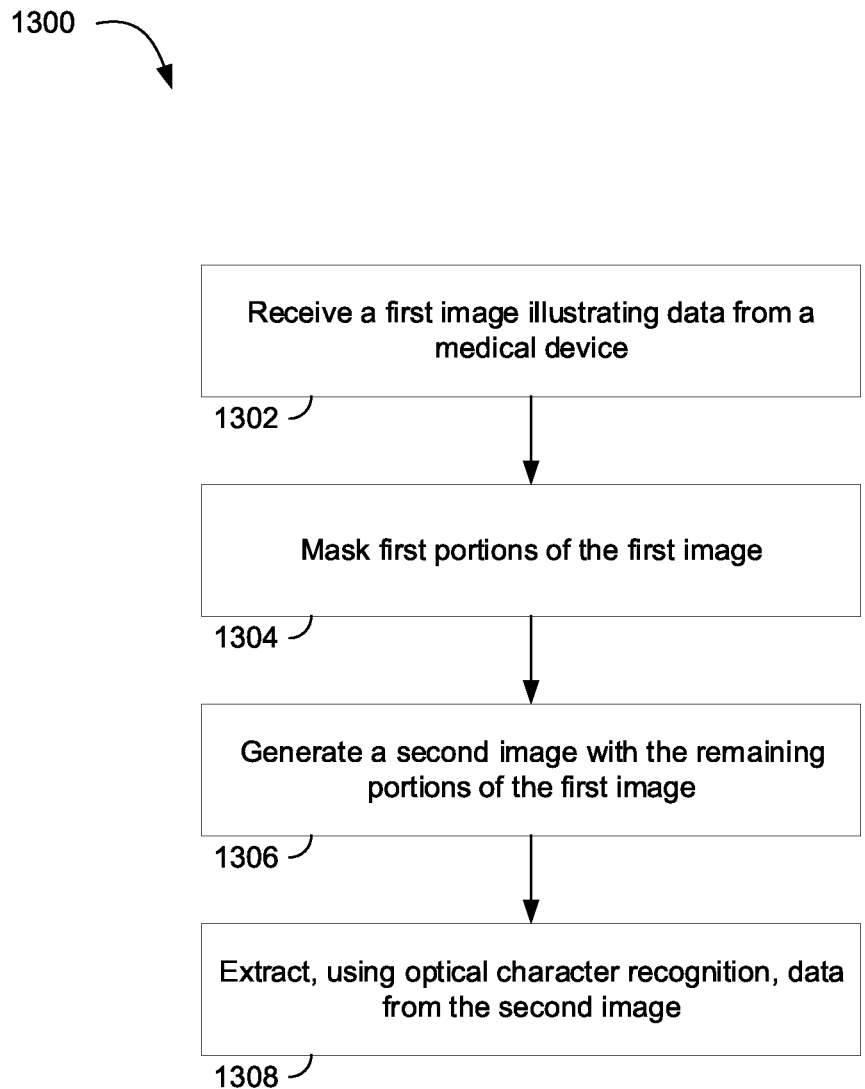
FIGS. 13 and 14 are flow diagrams of method steps for extracting data from an image and determining the validity of the extracted data, according to an aspect of the present disclosure.

A process 1300 of extracting data from an image is illustrated in FIG. 13. Process 1300 begins by receiving a first image illustrating data from a medical device 624 at step 1302. For example, remote link 102 captures image 1000 using image capture unit 628 and server 116 receives image 1000 from remote link 102.

Process 1300 continues by masking first portions of the first image at step 1304. For example, server 116 uses an image mask to occlude portions of image 1000 that will not be sent to OCR unit 630 for data extraction. Masking select portions of an image allows for improved efficiency of image processing because only the select portions of the image that are not masked will be sent to OCR unit 630 or DSP unit 634. By masking select portions of the image, less data is transmitted between server 116, OCR unit 630, and DSP unit 634, and OCR unit 630 and DSP unit 634 require less processing to extract data from the image. In one aspect, server 116 may generate image 1100 by using the image mask to strip image 1000 of certain portions of image 1000. For example, server 116 generates image 1100 by using the image mask to strip image 1000 of all portions except alarm and serial number portion 1102, performance level portion 1104, and flow level portion 1106. In another aspect, server 116 may select a different mask corresponding to features of image 1000. For example, server 116 selects a different mask based on the size of image 1000 or the GUI version corresponding to image 1000. For example, server 116 selects a mask based on a software version of the remote link 102. In some aspects, server 116 may select a mask based on the type of display screen 902 being used. For example, if the image displayed on display screen 902 is not the appropriate image for the first mask selected by server 116, server 116 determines that the first mask used is not the appropriate mask for image 1000 and select a different mask based on the image currently being displayed on display screen 902. In one aspect, server 116 may wait to mask portions of image 1000 until the appropriate image is being displayed on display screen 902. In another aspect, server 116 may select a mask based on the amount of data to be extracted from image 1000.

Process 1300 continues by generating a second image with the remaining portions of the first image at step 1306. For example, server 116 generates image 1200 by performing image processing to clarify and enlarge alarm and serial number portion 1102, performance level portion 1104, and flow rate portion 1106. In one aspect, server 116 may generate serial number portion 1202 and alarm portion 1204 from serial number portion 1102, performance level portion 1206 from performance level portion 1104, and present flow rate portion 1208, max flow rate portion 1210, and min flow rate portion 1212 from flow rate portion 1106.

Process 1300 finishes by extracting, using optical character recognition, data from the second image at step 1308. For example, the serial number of medical device 624, the type of alarm currently being indicated, the performance level of the pump 800, and the flow rate are extracted from image 1200 using OCR unit 630. In one aspect, OCR unit 630 may select a pixel from the second image to determine an alarm severity from alarm portion 1204. For example, OCR unit 630 determines the color of the pixel and determine the alarm severity based on the color of the pixel. In some aspects, OCR unit 630 may select two different pixels from the second image to determine the alarm severity from alarm portion 1204. For example, storage 120 stores a database of alarm types and alarm severity levels and corresponding alarm color. Server 116 may access the database stored in storage 120 and determine the alarm type and severity level associated with the color of the pixel or pixels from alarm portion 1204. In another aspect, OCR unit 630 may select a first pixel at a first time and a second pixel at a second time. For example, in some instances where image 1000 is defective when received by server 116, server 116 is not able to determine the color of a pixel from the second image at the first time. Server 116 receives another image 1000 to determine the color of another pixel from the second image at the second time. In other aspects, server 116 determines the alarm severity to be the same as the previous alarm severity if server 116 cannot determine the color of the pixel from the two pixels. In another aspect, process 1400, described below, may be used to validate the extracted data from the second image.

Figure 14:
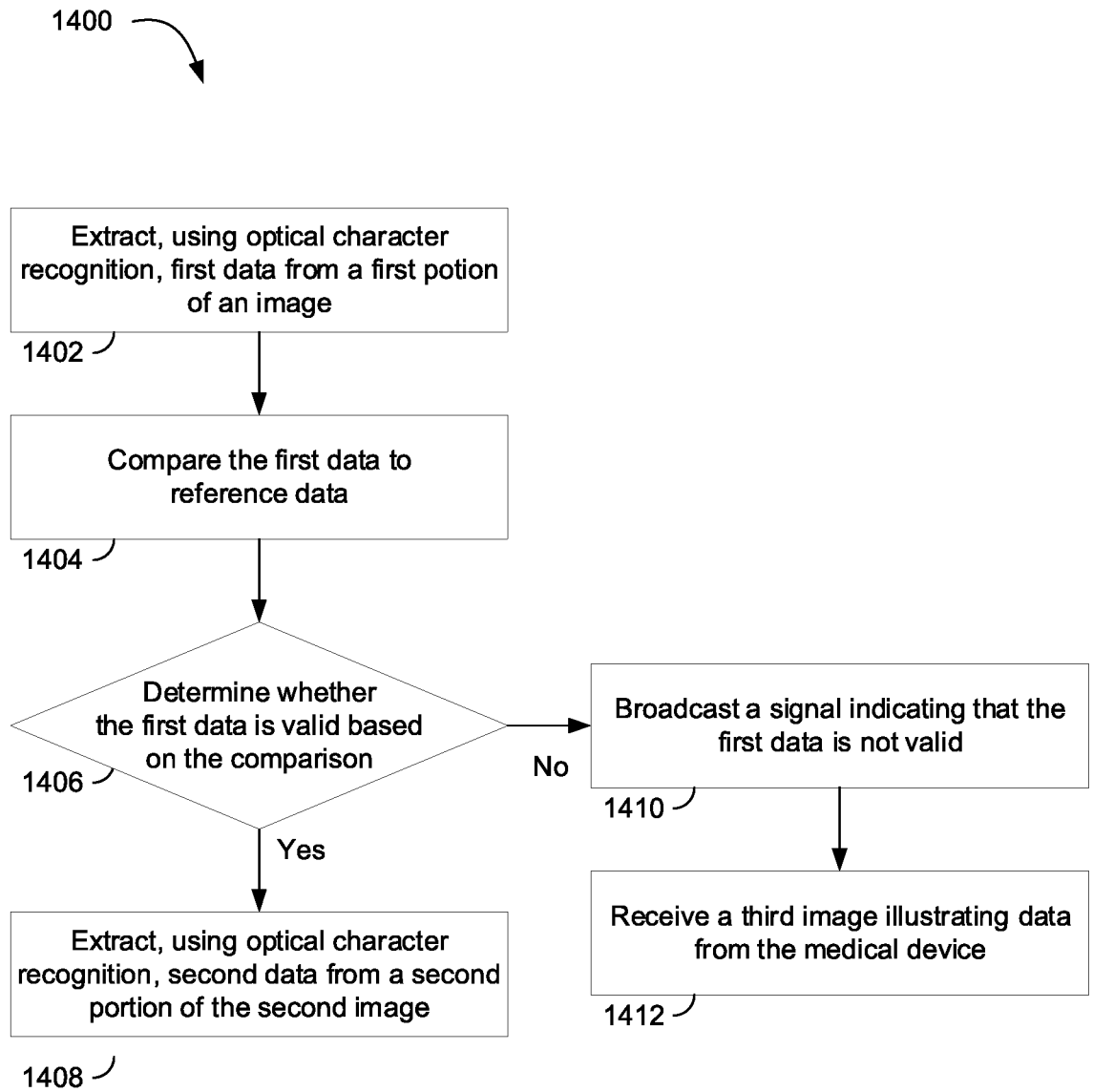

A process 1400 of determining the validity of data from an image is illustrated in FIG. 14. Process 1400 begins by extracting, using optical character recognition, first data from a first portion of an image at step 1402. For example, the serial number of medical device 624 is extracted from serial number portion 1202. In one aspect, process 1300, described above, may be used to perform extraction of first data from the first portion of the image.

Process 1400 continues by comparing the first data to reference data at step 1404. In one aspect, reference data may include a certain number of characters and/or digits that represent standard formats that may represent the first data. For example, the extracted serial number of medical device 624 is compared with possible serial numbers stored in document data type storage 120. Additional examples of comparing data to reference data are described in U.S. Pat. No. 9,002,083, entitled "System, Method, and Software for Optical Device Recognition Association," the entire contents of which are hereby incorporated by reference.

Process 1400 continues by determining the validity of the first data based on the comparison at step 1406. For example, if the extracted serial number of medical device 624 does not match a standard format for a serial number consisting e.g. of a certain number of characters and/or digits, the extracted serial number is not valid. In one aspect, if the extracted serial number does not comprise six digits and the standard format for the serial number is six digits, the extracted serial number is not valid. In another aspect, step 1406 repeats a certain amount of times before making a final determination. For example, if three attempts are required to validate the first data, the first data is determined to be valid if comparison results in a positive match three times. If during the three attempts one of the comparisons does not result in a positive match, the first data is determined to not be valid.

In response to determining that the first data is valid based on the comparison, process 1400 continues to step 1408. At step 1408, process 1400 continues by extracting, using optical character recognition, second data from a second portion of the second image. For example, the performance level of pump 800 is extracted from performance level portion 1206. As described in relation to FIG. 12, examples of the characters in the performance level portion 1206 may include "OFF" "P-0" "P-1", "P-2", "P-3", "P-4", "P-5" "P-6", "P-7", "P-8", and "P-9". In one aspect, process 1400 may continue to step 1402 until all data from the portions of image 1200 have been extracted.

In response to determining that the first data is not valid based on the comparison. Process 1400 continues to step 1410. At step 1410, process 1400 continues by broadcasting a signal indicating that the first data is not valid. For example, server 116 notifies the remote link 102 that image 1000 produced invalid first data.

Process 1400 finishes by receiving a third image illustrating data from the medical device at step 1412. For example, remote link 102 captures another image similar to 1000 using image capture unit 628 and server 116 may receive the similar image from remote link 102. In one aspect, process 1400 may continue to step 1402 until all data from the portions of image 1200 have been extracted.

Figure 15:
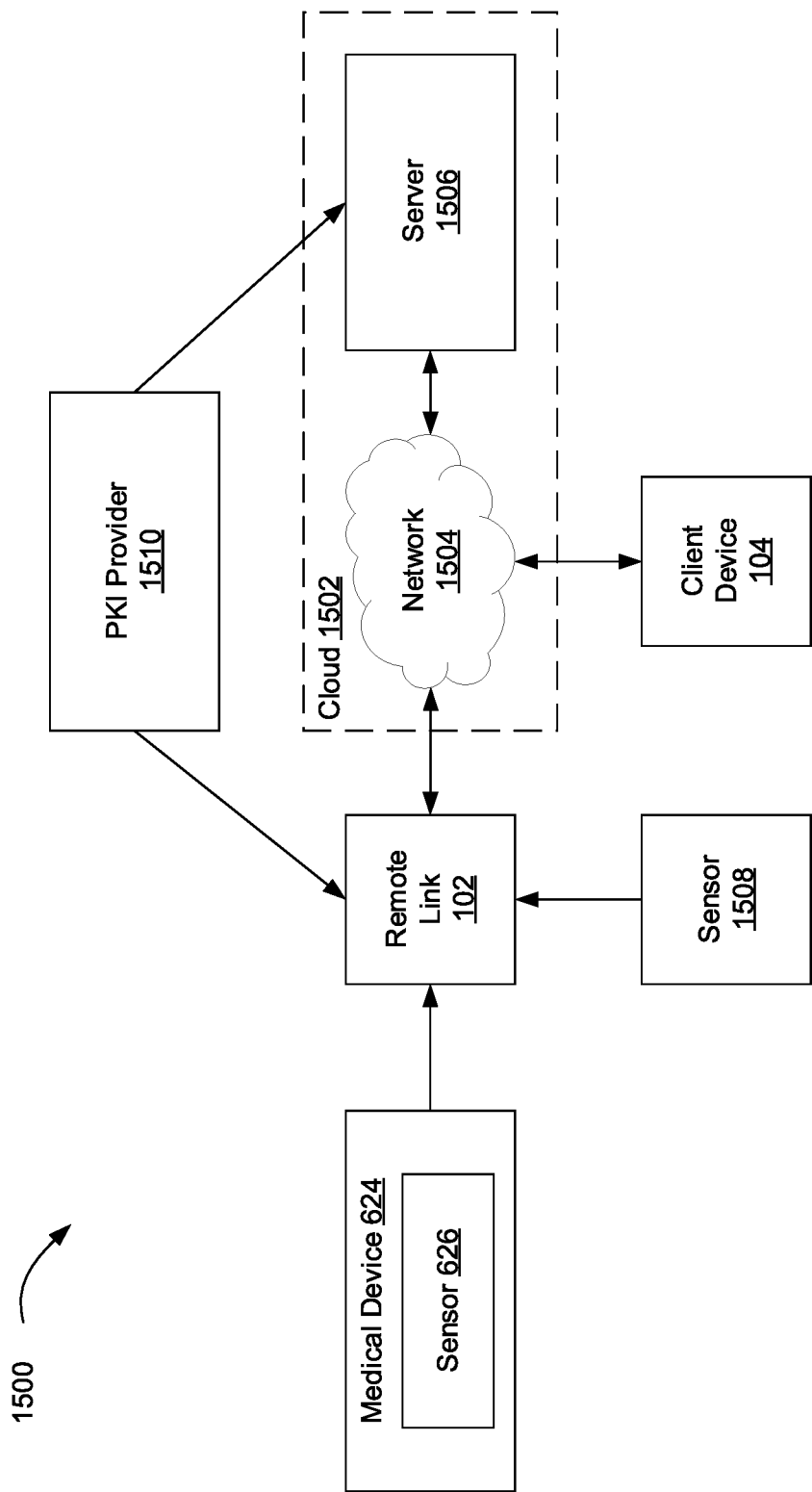
FIG. 15 shows a schematic representation of a remote link architecture, configured according to one or more aspects of the present disclosure.

FIG. 15 is a schematic representation of a remote link architecture 1500. Remote link architecture 1500 includes remote link 102, client device 104, cloud 1502, PKI provider 1510, external sensor 1508, and medical device 624. Cloud 1502 may include network 1504 and server 1506. Medical device 624 may include internal sensor 626.

Remote link 102 may be embedded in a medical device 624 that is monitoring a patient at a hospital, clinic, the patient's house, or another location. Remote link 102 may capture images and deliver video streams from the display of medical device 624 and transmit the images and video to the network 1504. Remote link architecture 1500 may comprise multiple remote links 102. Remote link 102 interacts with the rest of remote link architecture 1500 through network 1504.

Medical device 624 may be a medical device that is monitoring a patient at a hospital, clinic, the patient's house, or another location. Medical device 624 includes a sensor 626 that may be measuring and recording health signals from a patient. The sensor 626 may be a pressure sensor, temperature sensor, flow rate sensor, voltage sensor, current sensor, optical sensor, or audio sensor. External sensor 1508 may also be a pressure sensor, temperature sensor, flow rate sensor, voltage sensor, current sensor, optical sensor, or audio sensor communicatively coupled to remote link 102.

Client device 104 may be a personal computer, a tablet, or a mobile device with an internet connection. A medical professional using client device 104 may be interested in obtaining information from one or multiple remote links 102. Images captured by a remote link 102 may be accessed by the client device 104. In addition, if the medical professional is interested in observing a live video stream of the medical device 624 embedded with remote link 102, the client device can display the video stream. Remote link architecture 1500 may comprise multiple client devices 104. A single client device 104 may access multiple remote links 102, as long as the client device has access to the remote links 102.

Server 1506 may include a mechanism for clients to view information, data, and video streams from one or more remote links 102. Server 1506 may push messages to groups of client devices 104. Upon client device 104 connection to the server 1506, the client device 104 will register to the server 1506 for messages for either one or multiple remote links 102. The server 1506 will receive messages that will be applicable to one or more remote links 102. This message with associated data will be broadcasted to all connected client devices 104 for updates from those remote links 102.

Cloud 1502 represents a network 1504 of internet-based devices and connections such as servers 1506, storage, and applications.

PKI provider 1510 may include a mechanism for generating a public-private key pair associated with a remote link 102. The private key may be loaded into the remote link 102 during the manufacturing or distribution of the remote link 102. The PKI provider 1510 may store the public-private key pairs associated with multiple remote links 102. With respect to a particular data module, the PKI provider 1510 may be a manufacturer of the data module, e.g., Remote Link 102. The manufacturer may pre-load the data module at the time of manufacture with a public/private key pair. The manufacturer may also, at the same time or another time, provide a copy of the public/private key pair to the server 1506, which may be controlled and/or owned by a monitor of and/or operator of the medical device 624 and/or Remote link 102 or sensor 1508. In another implementation, the PKI provider 1510 may be an operator of the Remote link 102, e.g., a hospital, capable of loading a public/private key pair into the remote link via a data port or a data network connection. In yet another configuration, the data module, e.g., Remote link 102, may be configured to remotely access the PKI provider 1510 via a data network when, for example, the data module is connected to a data network during initialization, device startup, or registration. In some configurations, the PKI Provider 1510 is included as part of the cloud 1502. In certain implementations, the server 1506 includes the PKI provider 1510 such as including a function that enables generation of public/private key pairs.

Figure 16:
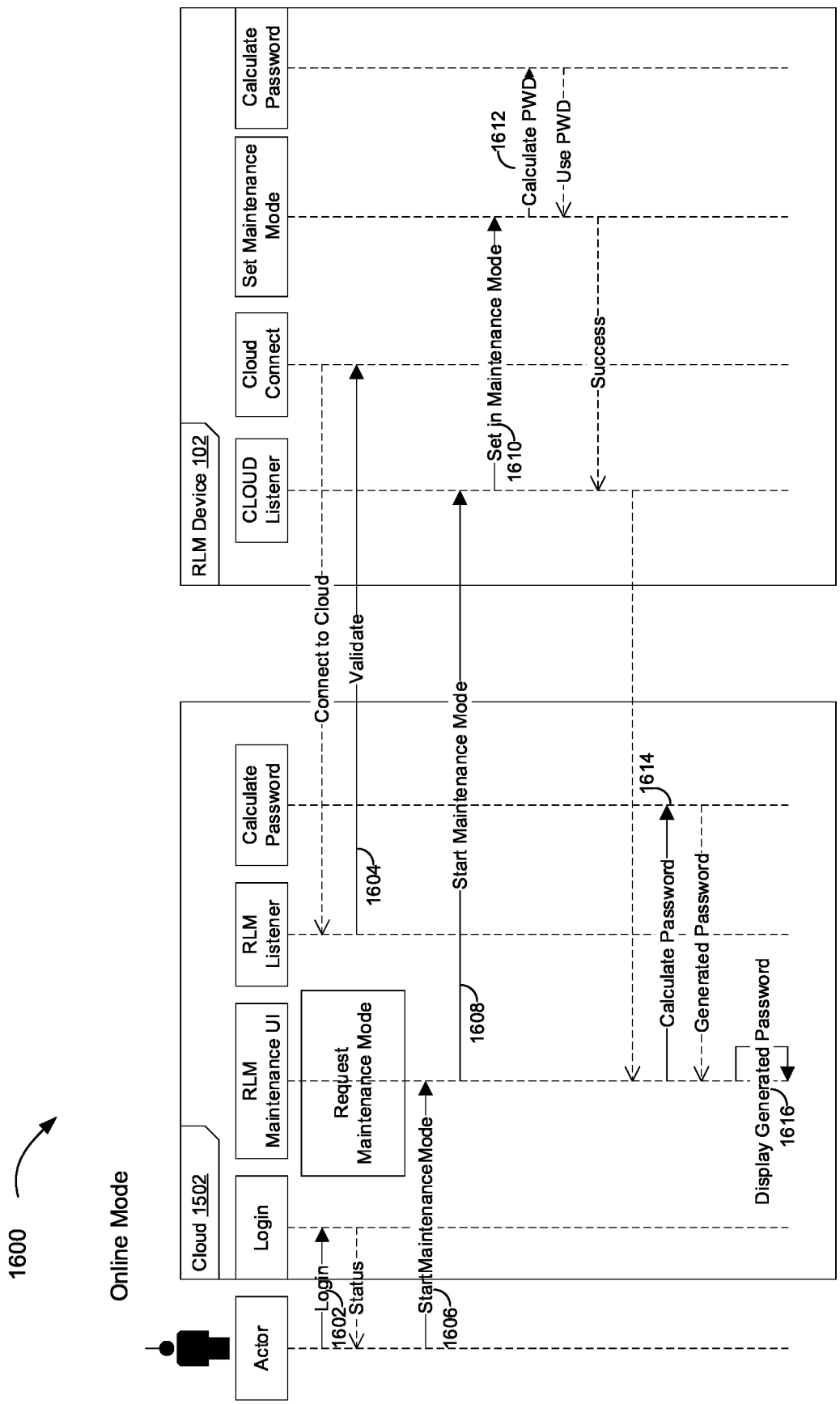
FIG. 16 is a flow diagram of method steps for authenticating a connection between a remote link and a server, according to an aspect of the present disclosure.

A process 1600 of authenticating a connection between a remote link 102 and a server 1206 while in online mode is illustrated in FIG. 16. Process 1600 begins by connecting a client device 104 to the cloud 1502 at step 1602. For example, a user may use client device 104 and login information to connect to a web user interface of the cloud 1502.

Process 1600 continues by connecting a remote link 102 to the cloud 1502 at step 1604. For example, remote link 102 may validate the connection to the cloud 1502 by transmitting messages to the cloud 1502 and receiving messages from the cloud 1502.

Process 1600 continues by requesting for the remote link 102 to start a maintenance mode at step 1606. For example, the user may use client device 104 to transmit a request to cloud 1502 to start a maintenance mode at the remote link. The maintenance mode would allow the user to access the internal settings and stored data of the remote link 102.

Process 1600 continues by transmitting a request from the cloud 1502 to the remote link 102 to start maintenance mode at step 1608. For example, server 1506 may transmit a message to remote link 102 using network 1504. The message may include a request for the remote link 102 to start maintenance mode. The "Start Maintenance Mode" message may include a time stamp based on a time maintained by the cloud 1502 where the timestamp corresponds to the time that a "Start Maintenance Mode" message is sent to the remote link 102, the time corresponding to a time when the cloud 1502 calculates the password at step 1614, or any other time specified by the cloud 1502. The time may include TAI, UTC, and/or UNIX time.

Process 1600 continues by setting the remote link 102 in maintenance mode at step 1610. For example, once the remote link 102 receives a request to start maintenance mode, the remote link 102 may change its operating mode to maintenance mode.

Process 1600 continues by calculating a password at the remote link 102 at step 1612. For example, the RLM device 102, e.g., remote link 102, may use a password generator or pseudo-random number generator to generation a password or authentication key. The RLM device 102 receives the time stamp from the cloud 1502 via the "Start Maintenance Mode" message. The RLM Device 102 uses at least the time stamp and its private key as inputs into the password generator or pseudo-random number generator to generate the password or authentication key. The password may be alpha-numeric. The password length may be 4, 8, 10, 12, 20, or greater characters in length. An authentication key may include a 32 bit, 64 bit, 128 bit, 512 bit, 1024 bit, 2048 bit, or larger authentication key. The password generation or pseudo-random number generation may be implemented according to the requirements specified by, for example, RFC 4086 and/or RFC 6328.

Process 1600 continues by calculating a password at the cloud 1502 at step 1614. The cloud 1502 may include a server, e.g., server 1506 of FIG. 15, that calculates the password. The sever 1506 may be loaded with the public/private key. The server 1506 may receive the public/private key pair from the PKI Provider 1510 for multiple RLM Devices 102 and store them. In one implementation, the server 1506 uses the time stamp and the private key associated with a particular RLM Device 102 to generate the password or authentication key to enable authentication access to that particular RLM Device 102.

Process 1600 finishes by displaying the generated password on the user interface of the cloud 1502 at step 1616. Additionally or alternatively, the cloud 1502 may store the generated password at, for example, server 1506. For example, once the password has been generated at the server 1506, the user may use client device 104 to receive the password from the server 1506 using network 1504. In certain implementations, the user or actor may not need to see the generated password or authentication key where the cloud 1502 provides the generated password or generated authentication key to a client device 104 to allow the client device 104 to authenticate itself to a data module, e.g., remote link 102. When a password is used, the client device 104 may present the password to the data module so that the data module can compare its password to the presented password. If the passwords match, the data module allows access by the client device 104. The client device 104 and data module, e.g., remote link 102, may set up a protected secure sockets layer (SSL) or TLS session and/or VPN connection to protect the password from eavesdropping during an access request and/or maintenance mode request. Alternatively, the client device 104 may present an authentication key to the data module during an access request. As a further alternative, the client device 104 and data module may use a challenge-response protocol or other cryptographic authentication scheme based on the authentication key or password to enable to data module to authenticate the client device 104 for subsequent access to the data module.

Figure 17:
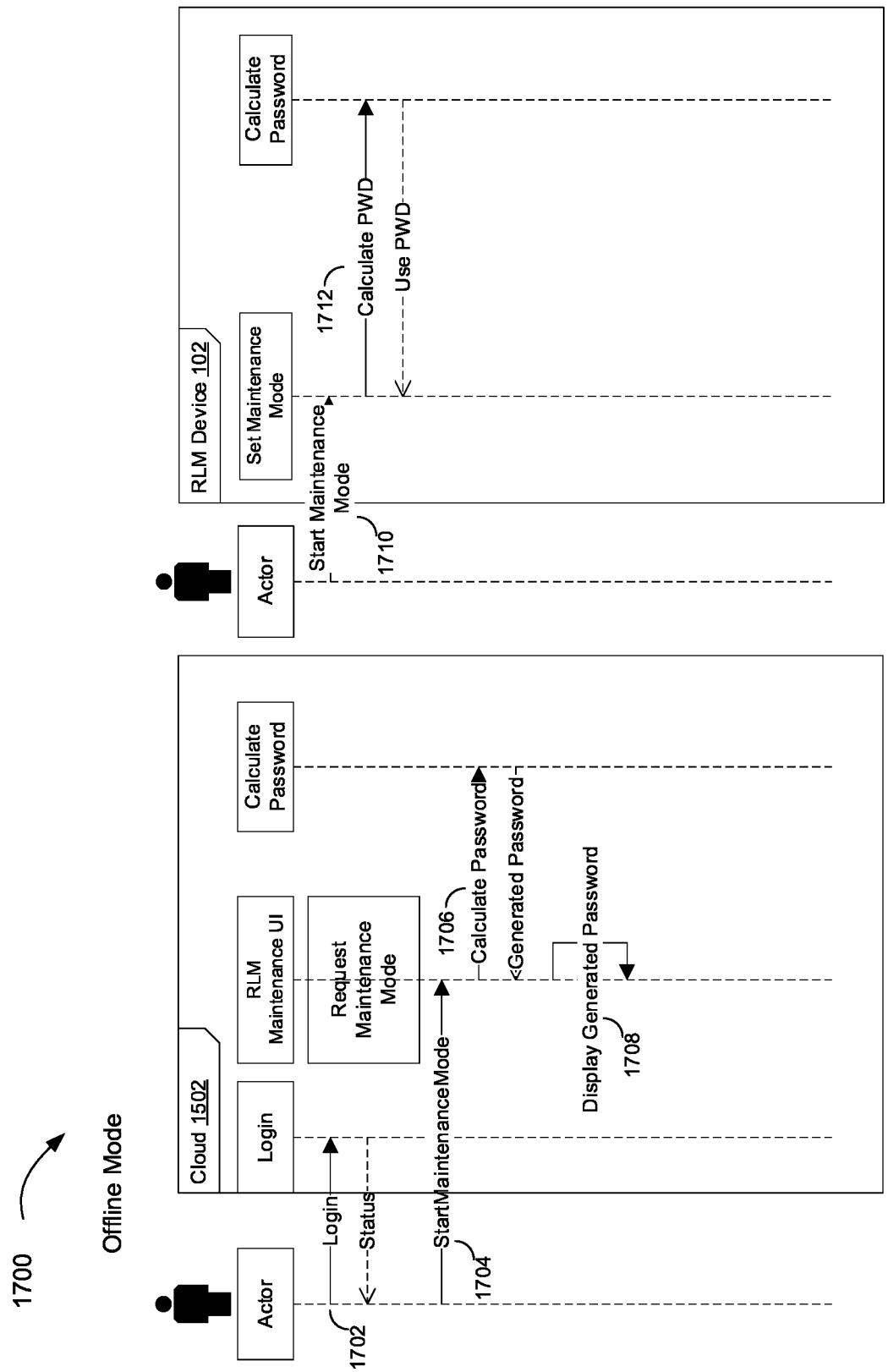
FIG. 17 is a flow diagram of method steps for authenticating a connection between a remote link and a server, according to an aspect of the present disclosure.

A process 1700 of authenticating a connection between a remote link 102 and a server 1506 while in offline mode is illustrated in FIG. 17. Process 1700 begins by connecting a client device 104 to the cloud 1502 at step 1702. For example, a user may use client device 104 and login information to connect to a web user interface of the cloud 1502.

Process 1700 continues by requesting for the remote link 102 to start a maintenance mode at step 1704. For example, the user may use client device 104 to transmit a request to cloud 1502 to start a maintenance mode at the remote link. The maintenance mode would allow the user to access the internal settings and stored data of the remote link 102.

Process 1700 continues by calculating a password at the cloud 1502 at step 1706. For example, server 1506 may use the private key associated with the remote link 102 and a time, e.g., current time, determined by the server 1506 as inputs into a password generator or pseudo-random number generator to generation the password or an authentication key. The password may be alpha-numeric. The password length may be 4, 8, 10, 12, 20, or greater characters in length. The password generation or pseudo-random number generation may be implemented according to the requirements specified by, for example, RFC 4086 and/or RFC 6328. In Offline mode, the time stamp may be based on a time maintained by the cloud 1502 where the timestamp corresponds to the time that a "Start Maintenance Mode" message is initiated by a user or actor, the time corresponding to a time when the cloud 1502 calculates the password at step 1706, or any other time specified by the cloud 1502. The time may be by rounded so as to establish a time interval whereby the cloud 1502 and RLM Device 102 have an overlapping and/or synchronized time interval whereby the separately determined times by the cloud 1502 and the RLM Device 102 are the same. In this way, the input times and private keys used to calculate the password or an authentication key are same, ensuring that the calculated passwords or authentication keys at the cloud 1502 and the RLM Device 102 are the same. The time interval may be adjustable to set a floor or ceiling of acceptable synchronization precision. For example, the time interval may be 1 second, 10 seconds, 30 seconds, 1 minutes, 5 minutes, 10 minutes, or greater. The longer the time interval, the more likely that the time determined by the cloud 1502 will be the same as the time used by the RLM Device 102, which accounts for deviations in clock timing between the cloud 1502 and the RLM Device 102. This synchronization technique may be used within Online Mode described according to FIG. 16 in addition to, or alternatively to including a timestamp in the "Start Maintenance Mode" message. The time may include TAI, UTC, and/or UNIX time.

Process 1700 continues by displaying the generated password on the user interface of the cloud 1502 at step 1708. Additionally or alternatively, the cloud 1502 may store the generated password at, for example, server 1506. Once the password has been generated at the server 1506, the user may use client device 104 to receive the password from the server 1506 using network 1504.

Process 1700 continues by setting the remote link 102 in maintenance mode at step 1710. For example, once the remote link 102 receives a request to start maintenance mode, the remote link 102 may change its operating mode to maintenance mode.

Process 1700 finishes by calculating a password at the remote link 102 at step 1712. As previously discussed, a password or authentication key may be generated based on at least inputs of a time stamp and the private key of a particular RLM Device 102 into a password generator or pseudo-random number generator which outputs a password or authentication key associated with the particular RLM Device 102. In Offline mode, the time stamp may be based on a time maintained by the RLM Device 102 where the timestamp corresponds to the time that a "Start Maintenance Mode" message is initiated by a user or actor, the time corresponding to a time when the RLM Device 102 calculates the password at step 1712, or any other time specified by the RLM Device 102. The time may be by rounded so as to establish a time interval whereby the cloud 1502 and RLM Device 102 have an overlapping and/or synchronized time interval whereby the separately determined times by the cloud 1502 and the RLM Device 102 are the same. In this way, the input times and private keys used to calculate the password or an authentication key at both the cloud 1502 and RLM Device 102 are same. The time interval may be adjustable to set a floor or ceiling of acceptable synchronization precision. For example, the time interval may be 1 second, 10 seconds, 30 seconds, 1 minutes, 5 minutes, 10 minutes, or greater. The longer the time interval, the more likely that the time determined by the cloud 1502 will be the same as the time used by the RLM Device 102, which accounts for deviations in clock timing between the cloud 1502 and the RLM Device 102. This synchronization technique may be used within Online Mode described according to FIG. 16 in addition to, or alternatively to including a timestamp in the "Start Maintenance Mode" message. The time may include TAI, UTC, and/or UNIX time.

Figure 18:
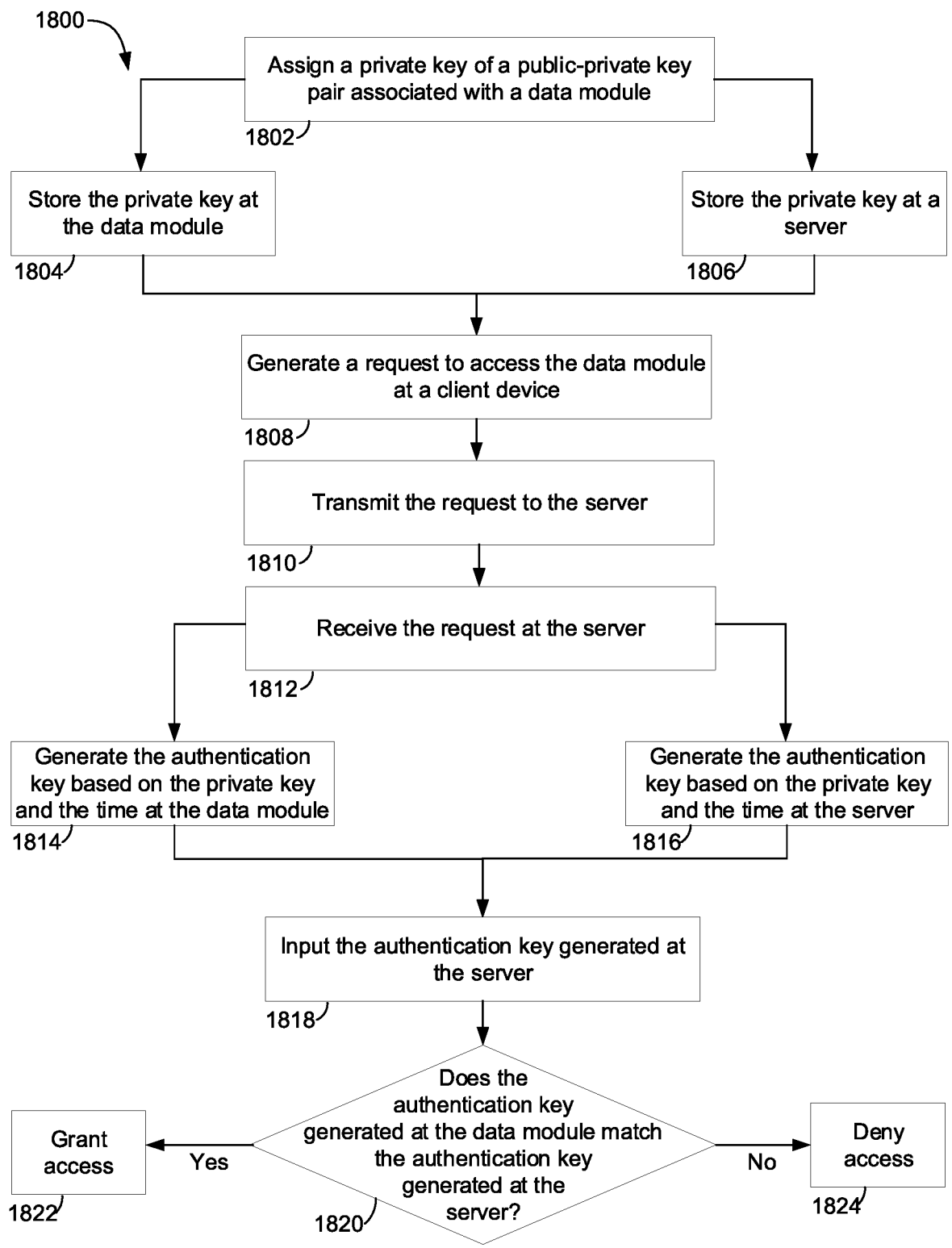
FIG. 18 is a flow diagram of method steps for authenticating a connection between a remote link and a server, according to an aspect of the present disclosure.

A process 1800 of authenticating a connection between a remote link (or data module) 102 and a server 1506 is illustrated in FIG. 18. Process 1800 begins by assigning a private key of a public-private key pair associated with the remote link 102 at step 1802. In one aspect, remote link 102 may receive pressure data, temperature data, flow rate data, voltage data, current data, optical data, or audio data from a medical device 624. In another aspect, the remote link 102 may receive data from an external sensor 1508.

Process 1800 continues by storing the private key at the data module 102 at step 1804. For example, the remote link 102 may have the private key loaded into the remote link 102 during manufacturing or distribution of the remote link 102.

Process 1800 continues by storing the private key at the server 1506 at step 1806. For example, the private key may be stored by the server after the private key is loaded into the data module. The server 1506 may have the private key of multiple remote links 102 stored in internal storage.

Process 1800 continues by generating a request to access the data module 102 at a client device 104 at step 1808. For example, the client device 104 may include a user interface configured to display data and receive a user input. A user may use the user interface to generate the request to access the data module 102. In one aspect, the request to access the data module 102 may include a request for the remote link 102 to enter into a maintenance mode.

Process 1800 continues by transmitting the request to the server 1506 for access to the remote link 102 at step 1810. For example, the user may use the user interface to transmit the request to the server 1506.

Process 1800 continues by receiving, at the server 1506, the request from the client device 104 for access to the remote link 102 at step 1812. For example, the server may receive the request using the network 1504.

Process 1800 continues by generating, at the remote link 102, an authentication key used to allow authenticated access to the remote link 102 based at least on the private key and a time at step 1814. For example, the remote link 102 may generate the authentication key using the PKI provider 1510 based on the private key and the time. In another aspect, the authentication key may be a one-time authentication key. For example, if the remote link 102 generates an authentication key, the authentication key may only be used once to access the remote link 102. In one aspect, the indication may include the time. The time may be determined by the server 1506 or may be determined independently by the remote link 102. The time determined by the remote link 102 may be synchronized with the time determined by the server 1506. In one aspect, the time is synchronized by rounding the time determined by the remote link 102 to a time interval and rounding the time determined by the server 1506 to the time interval such that the determined times are the same. For example, if the time interval is 5 minutes and the time determined by the remote link 102 is 09:04, the time would be rounded to 09:05. The time interval may be adjustable to set a floor or ceiling of acceptable synchronization precision. In one aspect, the time includes TAI (International Atomic Time), UTC (Coordinated Universal Time), or UNIX time.

Process 1800 continues by generating, at the server 1506, the authentication key based on the private key and the time at step 1816. For example, the server 1506 may generate the authentication key based on the private key and the time. In another aspect, the authentication key may be a one-time authentication key. For example, if the server 1506 generates an authentication key, the authentication key may only be used once to access the remote link 102.

Process 1800 continues by Process 1800 continues by receiving, at the server 1506, an indication from the remote link 102 that the authentication key generated at the server 1506 was entered at step 1818. For example, the server 1506 may transmit the authentication key generated at the server 1506 to the remote link 102 using network 1504, the user may input the authentication key generated at the server 1506 into the remote link 102, and the remote link 102 may transmit an indication to the server 1506 that indicates that the authentication key was entered. The remote link 102 may include a user interface configured to display data and receive a user input. A user may use the remote link 102 user interface to input the authentication key generated at the server 1506.

Process 1800 finishes by determining whether the authentication key generated at the remote link 102 and the authentication key generated at the server 1506 match at step 1820. If the authentication key generated at the remote link 102 matches the authentication key generated at the server 1506, authenticated access is granted at step 1822. Otherwise, if the authentication key generated at the remote link 102 does not match the authentication key generated at the server 1506, access is denied at step 1824. For example, if the authentication key generated at the remote link 102 does not match the authentication key generated at the server 1506, the remote link 102 can display a message indicating an authentication failure. In one aspect, the remote link 102 may authenticate the client device 104 using a challenge-response protocol.

Process 1800 allows for a user to securely connect to a remote link 102 connected to a medical device 624 and access the maintenance mode of the remote link 102. The user may then change the settings and procedures of the remote link 102. For example, the user may change the network 1504 connection settings. If authentication is successful, the remote link 102 may transmit the data to the client device 104. Process 1800 allows for a user to securely connect to a remote link 102 connected to a medical device 624 and access the data collected by the remote link 102 from the medical device.

Figure 19:
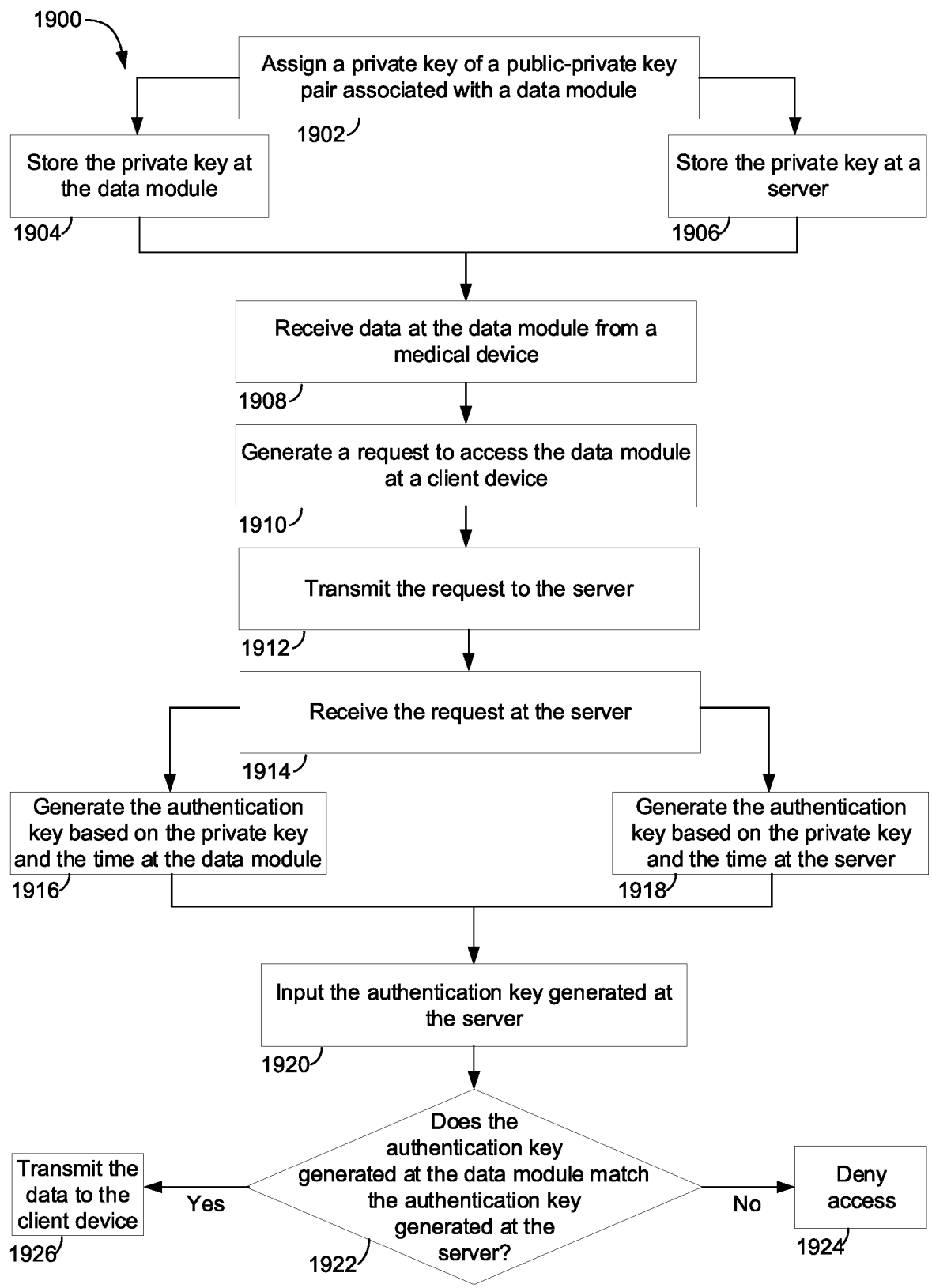
FIG. 19 is a flow diagram of method steps for authenticating a connection between a remote link and a server, according to an aspect of the present disclosure.

A process 1900 of authenticating a connection between a remote link (or data module) 102 and a server 1506 is illustrated in FIG. 19. Process 1900 begins by assigning a private key of a public-private key pair associated with the remote link 102 at step 1902.

Process 1900 continues by storing the private key at the data module 102 at step 1904. For example, the remote link 102 may have the private key loaded into the remote link 102 during manufacturing or distribution of the remote link 102.

Process 1900 continues by storing the private key at the server 1506 at step 1906. For example, the private key may be stored by the server after the private key is loaded into the data module. The server 1506 may have the private key of multiple remote links 102 stored in internal storage.

Process 1900 continues by receiving data at the remote link 102 from a medical device 624 at step 1908. For example, remote link 102 may receive pressure data, temperature data, flow rate data, voltage data, current data, optical data, or audio data from a medical device 624. In another aspect, the remote link 102 may receive data from an external sensor 1508.

Process 1900 continues by generating a request to access the data module 102 at a client device 104 at step 1910. For example, the client device 104 may include a user interface configured to display data and receive a user input. A user may use the user interface to generate the request to access the data module 102. In one aspect, the request to access the data module 102 may include a request for the remote link 102 to enter into a maintenance mode.

Process 1900 continues by transmitting the request to the server 1506 for access to the remote link 102 at step 1912. For example, the user may use the user interface to transmit the request to the server 1506.

Process 1900 continues by receiving, at the server 1506, the request from the client device 104 for access to the remote link 102 at step 1914. For example, the server may receive the request using the network 1504.

Process 1900 continues by generating, at the remote link 102, an authentication key used to allow authenticated access to the remote link 102 based at least on the private key and a time at step 1916. For example, the remote link 102 may generate the authentication key using the PKI provider 1510 based on the private key and the time. In another aspect, the authentication key may be a one-time authentication key. For example, if the remote link 102 generates an authentication key, the authentication key may only be used once to access the remote link 102. In one aspect, the indication may include the time. The time may be determined by the server 1506 or may be determined independently by the remote link 102. The time determined by the remote link 102 may be synchronized with the time determined by the server 1506. In one aspect, the time is synchronized by rounding the time determined by the remote link 102 to a time interval and rounding the time determined by the server 1506 to the time interval such that the determined times are the same. For example, if the time interval is 5 minutes and the time determined by the remote link 102 is 09:04, the time would be rounded to 09:05. The time interval may be adjustable to set a floor or ceiling of acceptable synchronization precision. In one aspect, the time includes TAI (International Atomic Time), UTC (Coordinated Universal Time), or UNIX time.

Process 1900 continues by generating, at the server 1506, the authentication key based on the private key and the time at step 1918. For example, the server 1506 may generate the authentication key based on the private key and the time. In another aspect, the authentication key may be a one-time authentication key. For example, if the server 1506 generates an authentication key, the authentication key may only be used once to access the remote link 102.

Process 1900 continues by receiving, at the server 1506, an indication from the remote link 102 that the authentication key generated at the server 1506 was entered at step 1920. For example, the server 1506 may transmit the authentication key generated at the server 1506 to the remote link 102 using network 1504, the user may input the authentication key generated at the server 1506 into the remote link 102, and the remote link 102 may transmit an indication to the server 1506 that indicates that the authentication key was entered. The remote link 102 may include a user interface configured to display data and receive a user input. A user may use the remote link 102 user interface to input the authentication key generated at the server 1506.

Process 1900 finishes by determining whether the authentication key generated at the remote link 102 and the authentication key generated at the server 1506 match at step 1922. If the authentication key generated at the remote link 102 does not match the authentication key generated at the server 1506, access is denied at step 1924. For example, if the authentication key generated at the remote link 102 does not match the authentication key generated at the server 1506, the remote link 102 can display a message indicating an authentication failure.

Otherwise, if the authentication key generated at the remote link 102 matches the authentication key generated at the server 1506, the remote link 102 may transmit the data to the client device 104 at step 1926. Process 1900 allows for a user to securely connect to a remote link 102 connected to a medical device 624 and access the data collected by the remote link 102 from the medical device.

It will be understood that while a percutaneous heart pump is described herein, any other medical device can be used on conjunction with the present disclosure. Furthermore, while FIGS. 8 and 9 show a media device configuration where a controller 900 is separate from a pump 800, one of ordinary skill readily recognizes that a medical device may be configured such that the controller and pump (or other elements) are integrated in the same housing.

Other objects, advantages and aspects of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A data monitoring system comprising:
a server computing device communicatively coupled to a client device and a data module via a data network, wherein the server computing device is configured to:
store a private key of a public-private key pair associated with the data module;
receive a request from the client device for authenticated access to the data module; and
generate an authentication key based at least on the private key and a time, wherein the authentication key is used to allow authenticated access to the data module wherein the authentication key is a one-time authentication key that expires after an assigned period of time;
the client device configured to:
generate the request for authenticated access to the data module; and
transmit the request to the server computing device; and the data module including a user interface configured to display data and receive a user input, wherein the data module is configured to:
store the private key of the public-private key pair associated with the data module;
receive data from a medical device; generate the authentication key based at least on the private key and the time; and
in response to determining that the authentication key generated by the data module and the authentication key generated by the server computing device match, grant authenticated access to the data module.

2. The system of claim 1, wherein the data module is further configured to, in response to determining that the authentication key generated by the data module and the authentication key generated by the server computing device do not match, display a message indicating an authentication failure.

3. The system of claim 1, wherein the data module is configured to grant authenticated access using a challenge-response protocol.

4. The system of claim 1, wherein, upon successful authentication, the data module is configured to transmit the data to the client device.

5. The system of claim 1, wherein the time is determined independently by the data module and the server computing device.

6. The system of claim 5, wherein a time determined by the data module is synchronized with a time determined by the server computing device.

7. The system of claim 6, wherein the time determined by the data module and the time determined by the server computing device are synchronized by rounding, by the data module, the time determined by the data module to a time interval and rounding, by the server computing device, the time determined by the server computing device to the time interval such that the time determined by the data module and the time determined by the server computing device are the same.

8. The system of claim 7, wherein the time interval is adjustable to set a floor or ceiling of acceptable synchronization precision.

9. The system of claim 1, wherein the time includes at least one of TAI, UTC, and UNIX time.

10. The system of claim 1, wherein the time is current time.

11. The system of claim 1, wherein the request for authenticated access to the data module includes additional information for instructing the data module.

12. The system of claim 11, wherein the additional information includes a request for access to the data module.

13. The system of claim 11, wherein the additional information includes the time, the time being determined by the server computing device.

14. The system of claim 11, wherein the additional information includes a request for the data module to enter a maintenance mode.

15. The system of claim 1, wherein the private key is loaded into the data module during at least one of manufacturing or distribution of the data module.

16. The system of claim 15, wherein the private key is further stored by the server computing device after the private key is loaded into the data module.

17. A method of securely monitoring a data module receiving data from a medical device, the method comprising:
storing, at a server, a private key of a public-private key pair associated with a data module;
receiving, at the server, a request from a client device for access to the data module;
generating, at the server, an authentication key based at least on the private key and a time, wherein the authentication key is used to allow authenticated access to the data module, and wherein the authentication key is a one-time authentication key that expires after an assigned period of time;
receiving, at the server, an indication from the data module that the authentication key generated at the server was entered; and
in response to determining that the authentication key generated by the server and an authentication key generated by the data module matches, granting authenticated access to the data module.

18. The method of claim 17, wherein the authentication key generated by the data module is generated based at least on the private key and the time.

* * * * *